(12) United States Patent
Petitto et al.

(10) Patent No.: US 6,500,114 B1
(45) Date of Patent: Dec. 31, 2002

(54) METHOD OF EXTRACTING BIOPSY CELLS FROM THE BREAST

(75) Inventors: Tony Petitto, Beverly Hills, CA (US); Stanislaw Loth, Sloatsburg, NY (US); Howard Worth, Venice, CA (US)

(73) Assignee: DOFI Technologies, Inc.

( * ) Notice: Subject to any disclaimer, the term of this patent is extended or adjusted under 35 U.S.C. 154(b) by 0 days.

(21) Appl. No.: 09/524,746

(22) Filed: Mar. 14, 2000

Related U.S. Application Data

(63) Continuation-in-part of application No. 09/115,810, filed on Jul. 15, 1998, now abandoned, which is a continuation-in-part of application No. 09/006,894, filed on Jan. 14, 1998, now Pat. No. 6,067,191, which is a continuation-in-part of application No. 08/345,806, filed on Nov. 22, 1994, now Pat. No. 5,774,260, which is a continuation-in-part of application No. 08/155,748, filed on Nov. 23, 1993, now Pat. No. 5,400,177.

(51) Int. Cl.[7] ................................................. A61B 1/12
(52) U.S. Cl. ........................ 600/156; 600/563; 600/160
(58) Field of Search ................................ 600/563, 564, 600/565, 566, 112, 156, 128, 153, 160; 604/35, 44; 348/65

(56) References Cited

U.S. PATENT DOCUMENTS

| | | |
|---|---|---|
| 2,449,886 A | 9/1948 | Dougherty |
| 2,739,585 A | 3/1956 | Ayre |
| 2,839,049 A | 6/1958 | MacLean |
| 2,847,990 A | 8/1958 | Ayre |
| 2,889,739 A | 6/1959 | Moore ........................ 88/16.6 |
| 2,891,444 A | 6/1959 | Ewald ............................ 88/29 |
| 2,955,591 A | 10/1960 | MacLean |
| 2,955,592 A | 10/1960 | MacLean |
| 3,074,396 A | 1/1963 | MacLean |
| 3,512,518 A | 5/1970 | Mishkin |

(List continued on next page.)

FOREIGN PATENT DOCUMENTS

| | | | |
|---|---|---|---|
| DE | 40 06 868 A1 | 9/1991 | ........... G02B/27/22 |
| GB | 2184286 | 6/1987 | ............ H01J/31/22 |
| WO | WO81/01201 | 4/1981 | ........... G03B/21/00 |

OTHER PUBLICATIONS

Okazaki et al., "Fiberoptic ductoscopy of the breat: A new diagnostic procedure for nipple discharge" Jpn.J. Clin. Oncol. (1991) 21(3):188–193.*

Makita et al., "Duct endoscopy and endoscopic biopsy in the evaluation of nipple discharge" Breast Cancer Research and Treatment (1991) 18:179–187.*

(List continued on next page.)

Primary Examiner—John P. Leubecker
(74) Attorney, Agent, or Firm—Arnold & Porter

(57) ABSTRACT

A method of extracting biopsy cells from a breast uses an endoscopic instrument having a distal end that is substantially needle like, a working channel, a light source and a lens. The instrument can be coupled to an apparatus for viewing an image including depth of field viewing. The instrument is inserted into a nipple of a breast and liquid is ejected from the distal end. Reverse pressure is applied so that the liquid and biopsy cells are retrieved into the instrument. The cells are then extracted from the breast.

14 Claims, 36 Drawing Sheets

U.S. PATENT DOCUMENTS

| | | | |
|---|---|---|---|
| 3,608,540 A | * | 9/1971 | Sartorius .................... 600/563 |
| 3,626,928 A | * | 12/1971 | Barringer et al. ........... 600/563 |
| 3,636,940 A | * | 1/1972 | Gravlee ...................... 600/653 |
| 3,784,742 A | | 1/1974 | Burnham et al. .......... 178/7.88 |
| 3,800,085 A | | 3/1974 | Ambats et al. |
| 3,820,873 A | | 6/1974 | Redington et al. .......... 350/124 |
| 3,881,464 A | | 5/1975 | Levene |
| 4,027,658 A | | 6/1977 | Marshall |
| 4,078,854 A | | 3/1978 | Yano .......................... 350/128 |
| 4,158,481 A | | 6/1979 | Hoyer ........................ 350/144 |
| 4,227,537 A | | 10/1980 | Suciu et al. |
| 4,235,244 A | | 11/1980 | Abele et al. |
| 4,235,245 A | | 11/1980 | Naito |
| 4,243,049 A | | 1/1981 | Goodale |
| 4,309,074 A | | 1/1982 | Granieri, Jr. ................ 350/144 |
| 4,361,948 A | | 12/1982 | Omata |
| 4,369,768 A | | 1/1983 | Vukovic |
| 4,391,495 A | | 7/1983 | Mazurkewitz |
| 4,414,565 A | | 11/1983 | Shanks ......................... 358/89 |
| 4,536,056 A | | 8/1985 | Oguino |
| 4,621,897 A | | 11/1986 | Bonnet ...................... 350/130 |
| 4,662,381 A | | 5/1987 | Inaba |
| 4,708,435 A | | 11/1987 | Yata et al. .................. 350/129 |
| 4,763,670 A | | 8/1988 | Manzo |
| 4,772,094 A | | 9/1988 | Sheiman ..................... 350/133 |
| 4,800,870 A | | 1/1989 | Reid, Jr. |
| 4,871,233 A | | 10/1989 | Sheiman ..................... 350/286 |
| 4,889,106 A | | 12/1989 | Watanabe |
| 4,927,238 A | | 5/1990 | Green et al. ............... 350/130 |
| 4,936,312 A | | 6/1990 | Tsukagoshi |
| 4,966,162 A | | 10/1990 | Wang |
| 5,061,052 A | | 10/1991 | DeJesus ...................... 359/742 |
| 5,081,999 A | * | 1/1992 | Hemstreet et al. .......... 600/563 |
| 5,133,361 A | | 7/1992 | Cox et al. |
| 5,137,030 A | | 8/1992 | Darougar |
| 5,146,365 A | | 9/1992 | Minoura et al. ............ 359/619 |
| 5,146,928 A | | 9/1992 | Esser |
| 5,353,070 A | | 10/1994 | Mitani et al. |
| 5,370,653 A | | 12/1994 | Cragg |
| 5,375,589 A | | 12/1994 | Bhatta |
| 5,400,177 A | | 3/1995 | Petitto et al. |
| 5,405,321 A | * | 4/1995 | Reeves ....................... 600/565 |
| 5,413,558 A | | 5/1995 | Paradis |
| 5,427,115 A | | 6/1995 | Rowland et al. |
| 5,474,075 A | | 12/1995 | Goldberg et al. |
| 5,535,756 A | | 7/1996 | Parasher |
| 5,579,164 A | | 11/1996 | Chapnik |
| 5,585,867 A | | 12/1996 | Ooya |
| 5,617,152 A | | 4/1997 | Stolov |
| 5,746,692 A | | 5/1998 | Bacich et al. |
| 5,774,260 A | | 6/1998 | Pettito et al. |
| 6,059,734 A | * | 5/2000 | Yoon .......................... 600/565 |
| 6,110,176 A | * | 8/2000 | Shapira ...................... 128/898 |
| 6,168,779 B1 | | 1/2001 | Barsky et al. |
| 6,221,622 B1 | | 4/2001 | Love |
| 6,328,709 B1 | | 12/2001 | Hung et al. |

OTHER PUBLICATIONS

Otto W. Sartorius, et al., Cytologic Evaluation of Breast Fluid in the Detection of Breast Disease, Journal of National Cancer Institute, vol. 59 No. 4, Oct. 1977, pp. 1073–1080.

Pole, R.V. et al., Real Time Computer–Generated 3–D Display, IBM Technical Disclosure Bulletin, vol. 10, No. 5, pp. 601–603 (Oct. 1967).

Jorma Ryhanen, Biocompatibility Evaluation of Nickel–Titanium Shape Memory Metal Alloy (1999) (Ph.D. Thesis, University of Oulu, Finland) (on file with the Oulu University Library) (also available in Adobe Acrobat format online at: http://herkules.oulu.fi/isbn9514252217/).

Shape Memory Applications, Inc., NiTi Smart Sheet,<http://www.sma–inc.com/biocomp.html>(visited Jan. 3, 2000).

Susan M. Love, Sanford H. Barsky; Breast–duct endoscopy to study stages of cancerous breast disease; The Lancet 1996: 348 997–99.

* cited by examiner

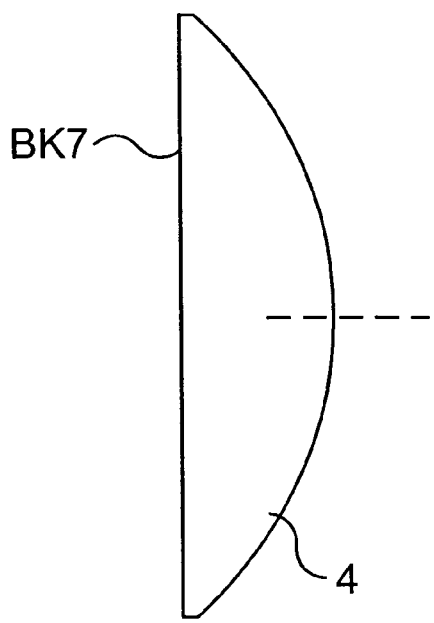
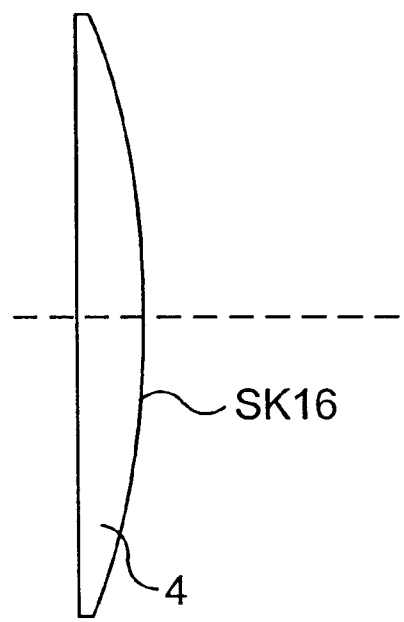
FIG. 6A  FIG. 6B
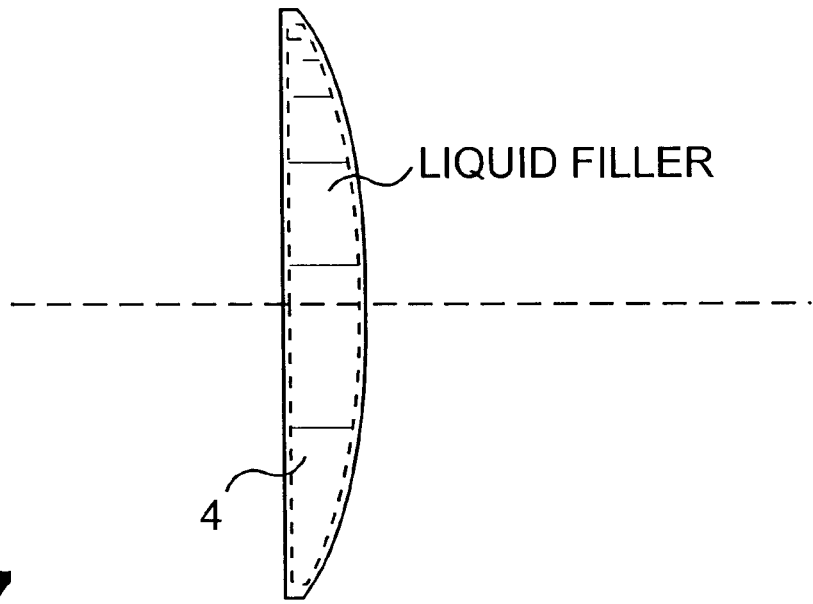
FIG. 7

METHOD OF EXTRACTING BIOPSY CELLS FROM THE BREAST

The present application is a continuation-in-part of co-pending U.S. Pat. application Ser. No. 09/115,810, filed Jul. 15, 1998, now abandoned, which is a continuation-in-part of U.S. patent application Ser. No. 09/006,894, filed Jan. 14, 1998, now U.S. Pat. No. 6,067,191, which is a continuation-in-part of U.S. patent application Ser. No. 08/345,806, filed Nov. 22, 1994, by Tony Petitto and Stanislaw Loth, for "Technique for Depth of Field Viewing of Images With Increased Clarity and Contrast," now U.S. Pat. No. 5,774,260, which is a continuation-in-part of U.S. patent application Ser. No. 08/155,748, filed Nov. 23, 1993, by Tony Petitto and Stanislaw Loth, for "Technique for Depth of Field Viewing of Images With Improved Clarity and Contrast," now U.S. Pat. No. 5,400,177, hereby incorporated by reference in their entirety.

BACKGROUND OF THE INVENTION

Depth of field viewing, as described in U.S. Pat. No. 5,400,177, is accomplished by enhancing depth cues which are present in every flat image, whether photographed or recorded electronically, without the requirement of special glasses, eye shutters or similar devices used in front of the viewers eyes. The depth cues are enhanced by a specially designed prismatic screen that separates the viewer's eye focus and convergence. The separation triggers the brain of the viewer to disregard convergence information indicating that the screen is flat, and to interpret the image depth cues as real.

To strengthen the focus and convergence separation and add additional image magnification, the present invention utilizes a specially designed magnifying lens as a supplement to the prismatic screen. The lens helps trigger the eye focus and convergence separation—making it stronger when combined with a prismatic screen such as is disclosed in U.S. Pat. No. 5,744,260. In addition, depending upon the particular design of the lens, the viewed image may magnified from 1.25× to 2.0×, and at the same time is cleared (cleaned) from the magnified raster of the video scanning lines. The clearing (cleaning) of the viewed image from the magnified raster is accomplished with the prismatic screen, as described in the parent application. With particular reference to FIGS. 29 to 36 of that application, the prismatic screen PR preferably includes three miniature prisms for each video scan line. As a result, each raster video scan line is divided two or three times, thereby providing a significant reduction in the visibility of the raster lines. In accordance with the present invention, as described in greater detail below, the prismatic screen may be either a flat or curved structure, depending upon the choice of additional optical elements in the system.

A number of designs on how to magnify a video small screen image to a larger screen image are described in patent literature. For example U.S. Pat. Nos. 2,449,886 and 5,061,052 disclose such systems. Each of these designs are based on using a positive lens, or a lens combined with a Fresnel lens, and each technique places the optical system near the front of the video monitor screen. The lenses are designed with a short focal length which may cause distortion, because the magnification of the image is not equal in the center and on the edges. Additionally, the Fresnel lens, which is a concentric design of a magnifying lens, may cause image degradation by lowering the image resolution. According to U.S. Pat. No. 5,061,052, the described system is intended to allow individuals of limited means to enjoy the entertainment and education provided by large screen television images, without the necessity of purchasing a large television set. However, such prior art television magnification of a small screen image to a larger screen image may cause distortion and a poor image, particularly since these systems magnify the raster of scanned video lines which make up the image. When the lines are magnified, the image is degraded and becomes distorted, and eyestrain may result. These and other disadvantages of the prior art are overcome by the present invention.

Recently, video monitoring and imaging technology has made its way into the operating room and the physician's office. One example of such medical uses for this technology includes the optical connection of a video camera and monitoring device to an endoscope or similar instrument that is adapted with fiber optics. Such instruments are used to perform medical procedures, such as biopsies, on internal organs without the need for extremely invasive surgery. They usually comprise a longitudinally extending hollow tube made of plastic or metal that is inserted into the body through an orifice or incision. A smaller passageway is included in the channel of the tube longitudinally, through which a medical instrument of some type, such as a biopsy brush or scrape, may be inserted for performing various procedures on the internal organ of interest. The physician, using a handle at the proximal end of the medical instrument, may manipulate the instrument as desired.

Such instruments have in the past involved a number of drawbacks. For example, because the instrument is inserted into the patient's body, it has been difficult to accurately view how the procedure is progressing. Some scopes have included fiber optic strands that allow the physician to see an image of the organ or tissue being treated. However, because of the small areas involved and the limited amount of light in such areas, such images have been of poor quality and limited use.

The dimensions of the scope have also often been too large. In order to minimize the invasiveness of the procedure, and therefore the pain and discomfort of the patient, the physical dimensions of the endoscope and its various parts are best minimized. Furthermore, many cavities of the human body are extremely small or difficult to get to and are incapable of receiving prior art scopes without damage to the surrounding tissue.

In addition, conventional biopsy brushes or other instruments used for cytological procedures in these small body cavities do not have the necessary flexibility or strength to provide for sufficient scraping and/or removal of cells from papillomas or other abnormalities.

BRIEF OBJECTS AND SUMMARY OF THE INVENTION

It is therefore an object of this invention to provide an endoscope that is capable of being used in many of the smallest cavities of the human body in various different procedures while generating an image of the area of the body being treated, which image has increased clarity and depth of field viewing.

The present invention satisfies these and other objects through the provision of an endoscope capable of being coupled to a video monitor adapted with a prismatic screen. The endoscope provides a view into the smallest cavities of the body and the monitor and screen project the image to the viewer with enhanced clarity and depth cues. The present invention further provides a stepped aspherical lens and a method of making the same for further increasing the quality of depth of field viewing.

It is another object of the present invention to facilitate removal of cells, tissue or other materials from the body. The present invention satisfies this and other objects through the provision of a Nitinol cytology instrument having improved strength and biocampatibility characteristics.

In one aspect, the present invention relates to a system including an endoscope comprising a guide having a working channel, a light source and a lens, said guide coupled to means for receiving a medical instrument, to means for irrigating and to means for supplying a video image. The endoscope is preferably coupled to a video camera, the video camera is preferably coupled to a video monitor. The video monitor is preferably coupled to a transparent screen which includes a plurality of generally parallel microprisms formed in the screen and extending horizontally across the width of the screen, said screen also coupled to an optical element operable to adjust the paths of light transmitted through said screen.

In another aspect, the present invention relates to a system including an instrument for retrieving biopsy cells from a body coupled to an apparatus for depth of field viewing. The apparatus includes a transparent screen for positioning between a flat image and a viewer, said transparent screen including a plurality of optical elements formed in said screen and an aspherical lens for positioning between said screen and a viewer, said lens being curved across its width which curvature is defined by at least two radii.

In another aspect, the present invention relates to a method of inspecting a breast with an endoscopic instrument wherein said endoscopic instrument includes a guide having a working channel, a light source and a lens; a first tube having a biopsy channel; a second tube having an irrigation channel; a third tube having an interior passageway; and a medical instrument for inserting into said biopsy channel and said working channel. The method includes inserting the distal end of said medical instrument into the dilated nipple of said breast and projecting an image of the interior of said breast on a video monitor.

In another aspect, the present invention relates to a method of extracting biopsy cells using an endoscopic instrument having a distal end that is substantially needle like. The method includes inserting said instrument into a body and causing liquid to be ejected from the distal end of said instrument. The method further includes causing reverse pressure to form at the distal end of such instrument so that said liquid and biopsy cells are retrieved into said instrument and extracting said cells from said body.

In yet another aspect, the present invention relates to a method of performing a medical procedure on the interior of a blood vessel using an endoscope having a substantially flexible guide of a length greater than one meter and which is optically coupled to a video monitor. The method includes inserting said guide into a blood vessel and projecting an image of the interior of said blood vessel on said video monitor.

In another aspect, the present invention relates to a method of clearing a clogged area in a lacrimal duct using an endoscope that includes a guide having an outer diameter of not more than about 1.2 mm and a working channel defined therein having an outer diameter of not more than about 0.35 mm, a first tube portion coupled to said guide having a biopsy channel defined therein; said biopsy channel being capable of receiving a medical instrument, a second tube portion coupled to said guide and having an irrigation channel defined therein, and a third tube portion coupled to said guide and having defined therein an interior passageway for holding fiber optic strands. The method includes inserting said guide into the lacrimal duct of a patient and projecting an image of the interior of said duct on a video monitor. The method also includes identifying the clogged area and clearing said area with a laser.

In another aspect, the present invention relates to a method of treating a tumor in an interior cavity of a body using an endoscopic instrument comprising a guide having a working channel, a light source and a lens; a first tube having a biopsy channel; said first tube coupled to said guide; a second tube having an irrigation channel; said second tube coupled to said guide; a third tube having an interior passageway; said third tube coupled to said guide; and a medical instrument for inserting into said biopsy channel and said working channel; said medical instrument being substantially needle like at its distal end. The method including inserting said guide into said cavity to approximately the position of the tumor and projecting an image of said tumor onto a video monitor. The method also includes injecting a chemotherpuetic liquid directly into said tumor by forcing said liquid through said irrigation channel and said working channel.

In yet another aspect, the present invention relates to a method of performing a medical procedure on the interior of a body using an endoscope coupled to a video monitor, said video monitor being coupled to a transparent screen which includes a plurality of generally parallel microprisms formed therein, said microprisms extending horizontally across the width of the screen, said screen coupled to an optical element operable to adjust the paths of light transmitted through said screen. The method includes inserting said endoscope into said body and projecting an image of the interior of said body on said screen.

In another aspect, the present invention relates to a system including an endoscope, a video monitor coupled to said endoscope, and an aspherical lens coupled to said video monitor.

In another aspect, the present invention relates to a system including means for examining the interior of a bodily cavity or hollow organ and means for displaying a video image coupled to said means for examining the interior of a bodily cavity or hollow organ. The system also includes aspherical lens means coupled to said means for displaying a video image, said aspherical lens means configured for adjusting the path of light transmitted through said means for displaying a video image.

In yet another aspect, the present invention relates to a method of viewing the progress of a medical procedure comprising the steps of generating an image of the interior of a bodily cavity or organ, displaying the image on a video monitor, and passing the image through an aspherical lens.

In another aspect, the present invention relates to a system including an endoscope having a 0.35 mm working channel, a video monitor coupled to said endoscope, and an optical element, wherein said video monitor is coupled to said optical element.

In another aspect, the present invention relates to a system including an endoscope, a cytology instrument, wherein said cytology instrument is slidably and releasably coupled within said endoscope, a video monitor coupled to said endoscope, and an optical element, said optical element coupled to said video monitor.

In another aspect, the present invention relates to a system including an endoscope for examining the interior of a bodily cavity or hollow organ, a video monitor coupled to said endoscope for displaying a video image, and a stepped aspherical lens coupled to said video monitor, said stepped aspherical lens configured to adjust the path of light transmitted through said video monitor.

In another aspect, the present invention relates to a method for making a stepped ashperical lens from a lens material, including the steps of cutting a plurality of radii steps into a surface of the lens material and polishing the plurality of radii steps.

In another aspect, the present invention relates to a cytology instrument for removing cells from a bodily material comprising a longitudinally extending main body portion having a proximal and a distal end, said distal end having a roughened surface and wherein said main body portion has a diameter of up to about 0.30 mm.

In yet another aspect, the present invention relates to a method of retrieving cells from a bodily material using a cytology instrument having a diameter of up to about 0.30 mm. The method comprising inserting the cytology instrument through a working channel of an endoscopic device and scraping a surface of a targeted bodily tissue to remove material from the surface. The method also includes injecting a fluid through an irrigation channel of an endoscopic device, wherein the fluid mixes with the material removed from the surface forming a fluid-material mixture and removing the cytology instrument from the working channel. The method further includes aspirating the fluid-material mixture through the working channel.

BRIEF DESCRIPTION OF THE DRAWINGS

The foregoing objects, as well as additional objects, features and advantages of the present invention, will be apparent from the following detailed description when read in light of the accompanying drawings, wherein:

FIG. 6A is an illustration of an embodiment of the present invention with the lens 4 made in BK7 glass;

FIG. 6B is an illustration of another embodiment of the present invention with the lens 4 made with high refraction index SK16 glass;

FIG. 7 is an illustration of yet another embodiment of the present invention with the lens 4 designed as a hollow optical structure which is filled with a liquid high refraction index filler;

DETAILED DESCRIPTION

Figure 1:
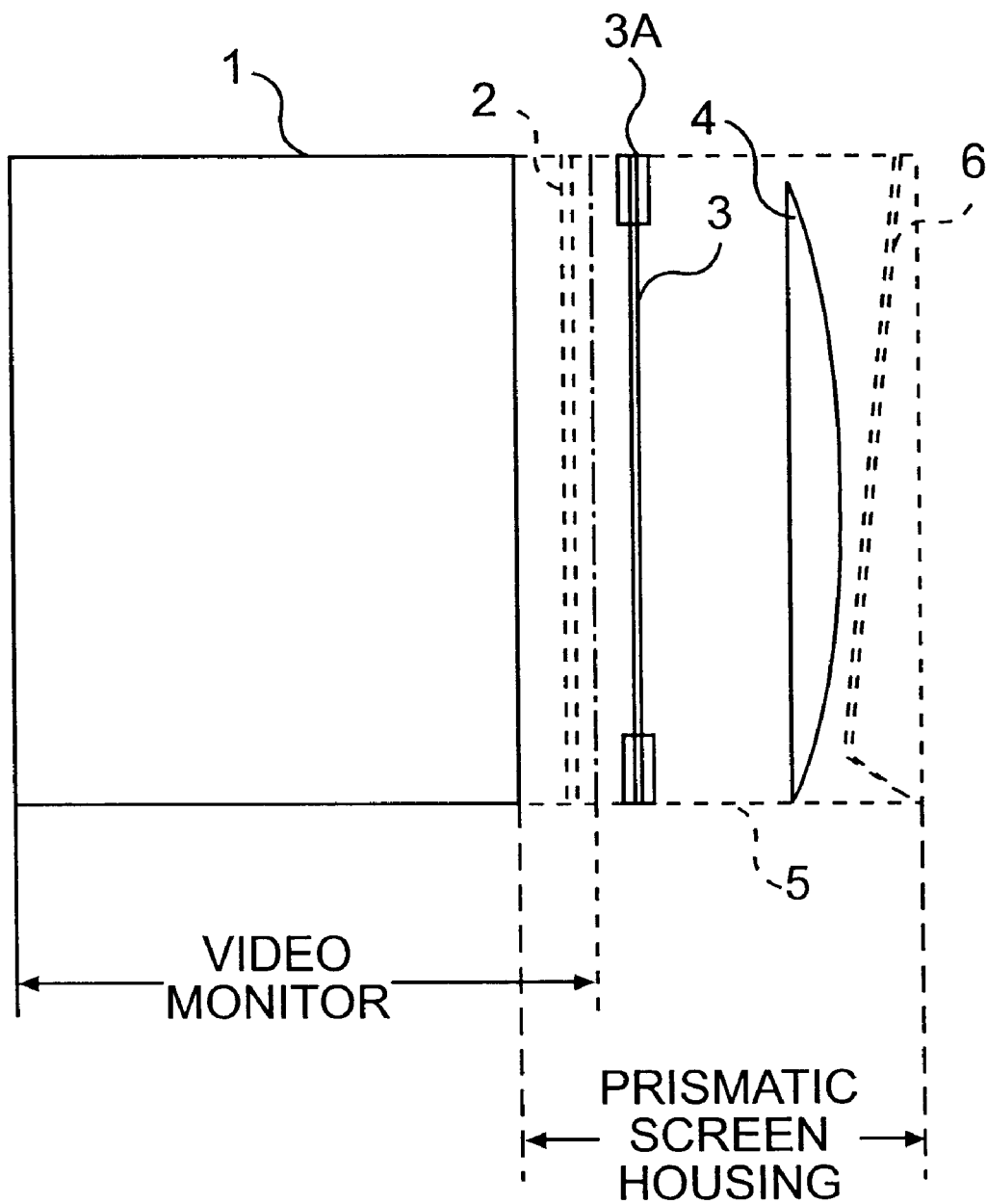
FIG. 1 is an illustration of the present invention including the magnifying lens 4.

Although the present invention is described below in connection with specific embodiments, it will be appreciated that the invention is not limited to the described embodiments. For example, portions of the present invention are housed and the optical elements are aligned with high precision in a frame that is constructed in height and width to be attached to the front of any existing video monitor. However, other techniques for housing and mounting the optical elements may also be used. Moreover, other portions of the invention are describing as being of various dimensions, forms and uses. However, except as specifically claimed, the invention is not intended to be so limited.

The present invention, when attached to a 19" or 13" medical video monitor, is designed to permit the viewer to observe the 2" diameter, micro endoscopic image as described in application Ser. No. 08/155,748, magnified 1.25× to 2.0×. The image also appears to the viewer with improved resolution, with enhanced image detail and image depth cues, which are not recognizable in a less detailed video image.

In Laparoendoscopic/Endoscopic surgery procedures, the video image is transmitted directly from the inside of the patient's body to a 19" or 13" video monitor. Of particular importance is Micro Endoscopic procedures that are viewed through a micro fiber optic image conduit. The image is typically taken in a relatively low light environment, and the final image that appears on the 19" medical monitor is only 2" in diameter and is often noisy and characterized by relatively poor resolution quality.

Micro Endoscopic procedures for the Parotid tear duct, Lacrimal tear duct, breast exploration and reconstructive surgery, disorders of the spine, Neurosurgery of the brain and nerve system, inner ear, nose and throat (Otolaryngology), reconstructive plastic surgery, Fallopascopy, Gynecology, reproductive genetics and minimally invasive veterinary surgery are performed using scopes with fiber optic bundles that range in diameter from 0.3 mm to 3.0 mm. These difficult procedures have opened new avenues of improvement on surgery of the human body. Such procedures eliminate the need to open large operation areas and allow one to reach into and see inside very small and narrow body ducts. It also reduces the patient's trauma, stress, danger of infection, and allows the patient in most cases to recover quickly.

With all the latest improvements in the lens, fiber optic, video camera, high-resolution video monitor and actual technique in the different micro procedures the image quality transmitted to the video monitor often remains poor. The relatively poor quality is not only caused by the small size of the viewed image, but also results from poor sharpness and clarity of the image. This is the result of the lens at the end of the fiber optic conduit being only a minimum ⅟50th of an inch in diameter of the environment in which the image is taken.

The 2" micro image transmitted through the fiber optic is focused into the video camera as a relatively small and dark image. The image is only ⅙th of the height of a 19" monitor screen, and occupies only ⅟40th of the monitor screen surface. However, the 19" monitor is the monitor of choice for most surgeons for Micro Endoscopic procedures because on the 13" monitor the micro image is only 1.25" in diameter. It is often very difficult to perform micro procedures with such a small image.

Both the 19" and 13" medical video monitor images are constructed with the same components, the video image pixels (small electronic dots which form the raster of scanning lines which form the image). Both 19" and 13" basic video monitors contain the same amount of 200 scanning resolution lines. A raster scanning line, which runs the width of the video screen, is approximately 1.0 mm high, ⅟25th of an inch; and the space between the raster lines is normally 0.5 mm, ⅟50th of an inch. The thickness of the lines and the space between the lines creates 200 scanning lines of basic image resolution that fills, top to bottom, the video monitor screen.

In comparing the video image with a film image, the video image resolution is as much as 15 times lower. Quality photographic lenses are usually manufactured with 100 times better resolution (100 lines per 1.0 mm).

Normal endoscopic video systems project the image to the full size of the video screen. This is because they are not restricted to the ⅟24th of an inch diameter of the fiber optic light conduit and are equipped with a powerful light source to illuminate the viewing area. This, however, is impossible to achieve with the micro endoscopic imaging systems.

The micro endoscopic video system is an electronic and optical breakthrough in surgical technique that allows the small, confined areas of the human body like the tear duct and the spinal canal to be imaged. However, the poor image quality and its 2" diameter size have limited its application and effectiveness. It is for this reason that the present invention achieves significant improvement over the deficiencies of prior art television screen magnification screen systems and is an extension to micro endoscopic technology, which helps solve the surgeon's needs for an enlarged, enhanced quality, depth of field image as viewed on the video monitor screen.

Referring now to FIG. 1, a 19" video monitor 1, includes a video screen 2. A housing 5 is attached in front of the video screen 2, and contains the mounted depth of field prismatic screen 3. The screen 3 is assembled in a frame 3A. As described in application Ser. No. 08/155,748, now U.S. Pat. No. 5,400,177, the depth of field screen is a multi prismatic structure with a plurality of horizontal micro prisms which extend across the width of the inner surface of the depth of field screen 3. Particular reference is made to FIGS. 5-12, 25-36 and 39 of that patent and the accompanying written specification for a more detailed description of the depth of field screen.

In one embodiment of the present invention, a magnifying lens 4 placed in the front portion of the housing 5 provides stronger depth cue enhancement and magnifies the image for easier viewing. In relation to the 2" diameter micro image, the magnification does not exceed 2.0×. In relation to a fall screen video image, the magnification does not exceed 1.25×. In accordance with the present invention, the prismatic screen 3 and the lens 4 are designed as a single optical system. Without the prismatic screen, the lens 4 would magnify the image as well as the raster scan lines, making the image unacceptable. The prismatic screen as described in application Ser. No. 08/155,748 without the lens 4, does not magnify the image 1.25× to 2.0×.

The housing 5 attaches the optical elements to the front of the video monitor. Preferably, the front and rear portions of the housing are sealed with front and rear tempered glass windows, respectively, which are treated with anti-reflection coatings. The lens 4 may be an acrylic plano convex lens which is designed to provide focus and convergence separation. The focal length of the lens 4 is relatively long, preferably about 30 inches, but advantageously may range from 10" to 40". The lens 4 is preferably mounted about 5 inches from the video screen.

The prismatic screen 3, described fully in parent application Ser. No. 08/155,748 (incorporated herein by reference) is placed between the lens 4 and the video screen to provide additional focus and convergence information, and to reduce the size of video raster lines by three times. The prismatic screen is preferably mounted near the video screen with the "rows" of prism lenses running parallel to the video scan lines. The interior portion of the housing is preferably blackened to separate the viewed image from ambient light and reflections, which also helps to strengthen depth cues. Preferably, the outside front portion of the housing includes a black frame which tilts the optical front window by approximately 50 degrees to 100 degrees toward the inside of the housing to help eliminate reflections of bright objects and ambient light that may be present in front of the glass window.

The manner in which viewers eyes perceive depth cues is described in application Ser. No. 08/155,748 with particular reference to FIGS. 13 to 22. In the same application, the manner in which the prismatic screen reduces the raster of video scanning lines is described with reference to FIGS. 31 to 36B. In the present invention, the plano convex lens 4, when combined with the prismatic screen also serves as a depth cue enhancement lens. The screen 3 and the lens 4 are designed as a single optical system 3–4.

Figure 2:
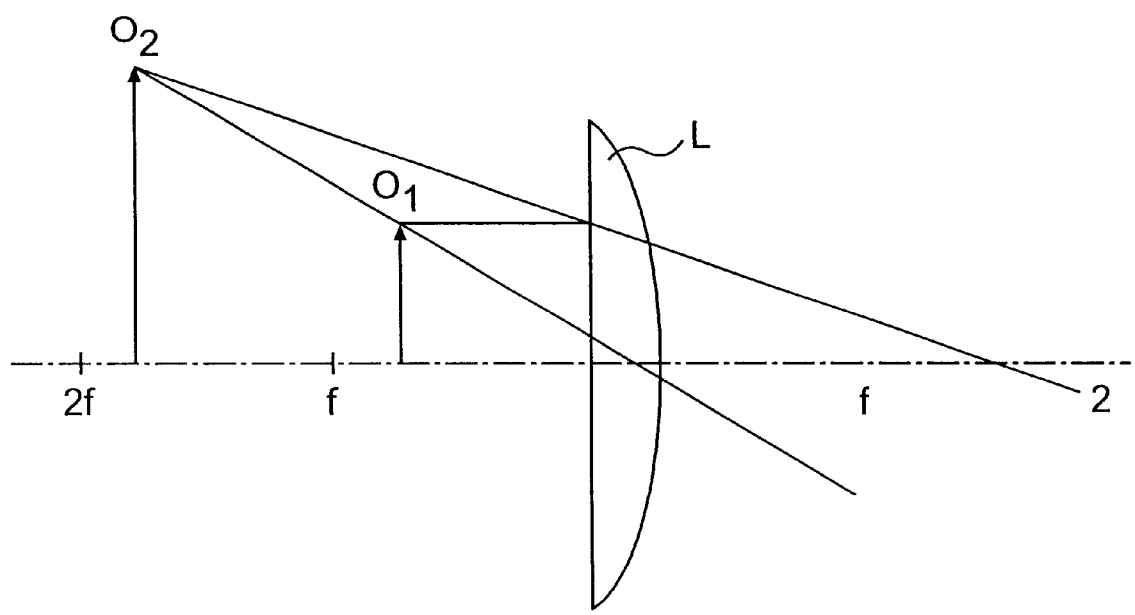
FIG. 2 is an illustration of how a piano convex lens magnifies an image.

FIG. 2 illustrates how a plano convex lens magnifies a video image. A viewed object $O_1$ is magnified by the lens L to provide a magnified object image $O_2$. In one embodiment, the eye viewing distance to the lens is variable and the focal length of the lens is preferably a relatively long focal length.

Figure 3:
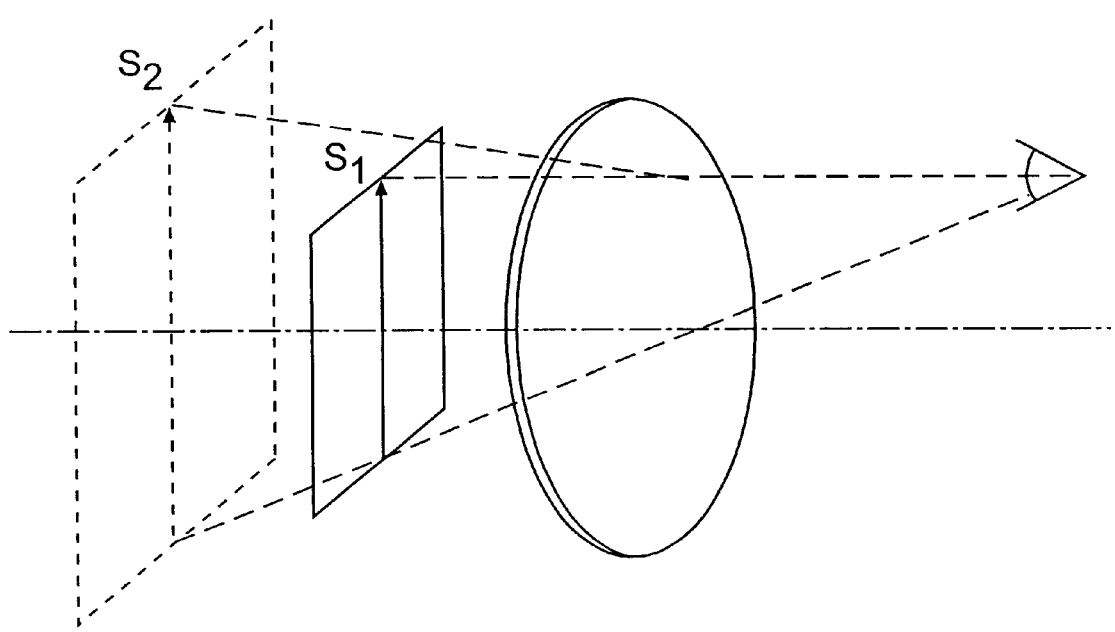
FIG. 3 is an illustration of how the piano convex lens magnifies the video image in accordance with one aspect of the present invention.

FIG. 3 illustrates how the long focal length lens is used in the present invention. In one embodiment, the magnification of the video screen S1, to the virtual image S2, is accomplished with a 25 inch diameter lens having a focal length of 762 mm and placed at the distance of 126 mm from the video screen. Since the primary object in the design of the lens is to strengthen the depth cues in the video image, the magnification can be kept as low as about 1.25×, which is below the distortion range caused by image magnification.

Figure 4:
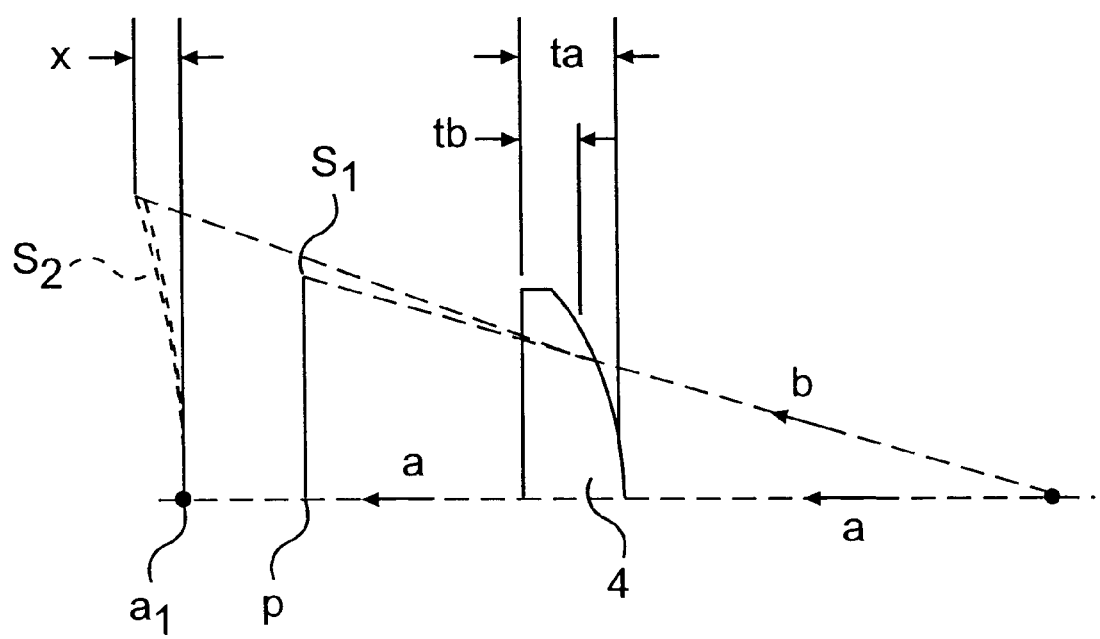
FIG. 4 is an illustration of how the magnifying lens 4 enhances the depth cues of the viewed video image.

FIG. 4 illustrates the manner in which depth cues are enhanced. When a light beam passes through a transparent structure of glass or plastic, depending on the refraction index and the thickness of the structure, the image will focus at a shorter distance. When the structure is a plano convex lens, the image will be focused at a shortened distance "a" at the center of the lens, where the lens is thicker. Light passing through the thinner peripheral portions of the lens will be focused at "b". By using BK7 glass, which has a refraction index of 1.5163, the effective length of the light beam is shortened by about ⅓ of the BK7 glass thickness, and less at the edge of the lens.

A planar image p at the location of the screen S1 is seen through the lens 4 as a slightly curved image S2. This added curvature separates focus and convergence distances perceived by the eye and enhances the depth cues present in the planar image. As shown in FIG. 4, a light beam a passing through the central portion of the lens 4 encounters a lens thickness $t_a$. On the other hand, the light beam b passes through a peripheral portion of the lens 4 having a reduced thickness $t_b$. The lens causes focus displacing (shifting) across the image of BK7 glass approximately $X=t_a/3-t_b/3$. The shifting "X" causes an inconsistent reading of the eye focus and convergence relative to the planar video image p.

The image shifting caused by the lens provides a similar effect to the prismatic screen as described in application Ser. No. 08/155,748. The lens and the prismatic screen combined into a single optical system causes an increased focus and a convergence displacement, which cuts off the convergence ability of the eyes to indicate to the viewer that the video image is flat. This allows the brain to analyze the depth cues to be perceived as real depth.

Figure 5A:
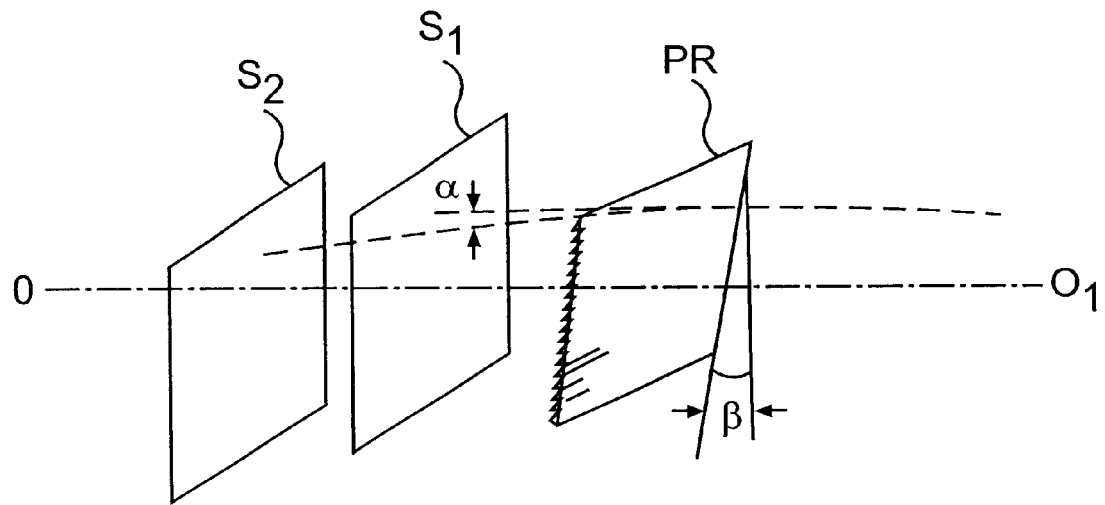
FIG. 5A is an illustration of the location of the prismatic screen in front of the video screen as illustrated in U.S. Pat. No. 5,400,177.

FIG. 5A illustrates the arrangement in application Ser. No. 08/155,748 of the prismatic screen PR, the video screen S1 and the virtual image S2. The virtual image S2, appears behind the video screen S1, shifted down by the angle alpha. This image shifting is also related to the tilt of the prismatic screen angle beta. A typical value for the angle beta would be approximately 60.

Figure 5B:
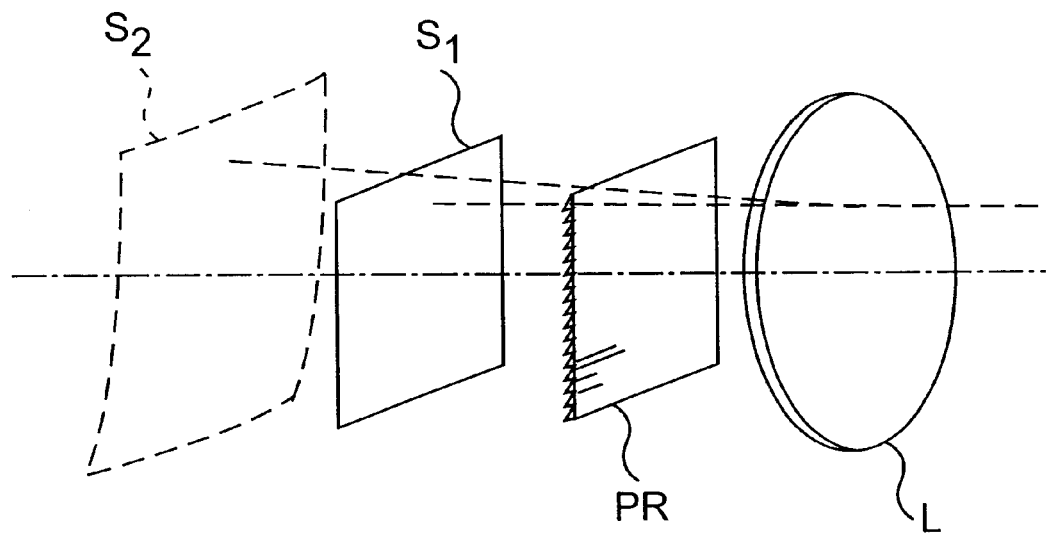
FIG. 5B is an illustration of one embodiment of the present invention with the lens 4 placed in front of the prismatic screen.

FIG. 5B illustrates the optical system of FIG. 5A combined with the lens L into a single optical system. The resultant virtual image S2 is magnified, causing a stronger focus and convergence displacement, and therefore a stronger depth cue effect enhancement. In addition, as described in the parent application, particularly with reference to FIGS. 29 to 36b, the prismatic screen PR preferably includes three miniature prisms for each video scan line. As a result, each raster video scanning line is divided into three, thereby providing a significant reduction in visibility of raster video scanning lines.

Figure 5C:
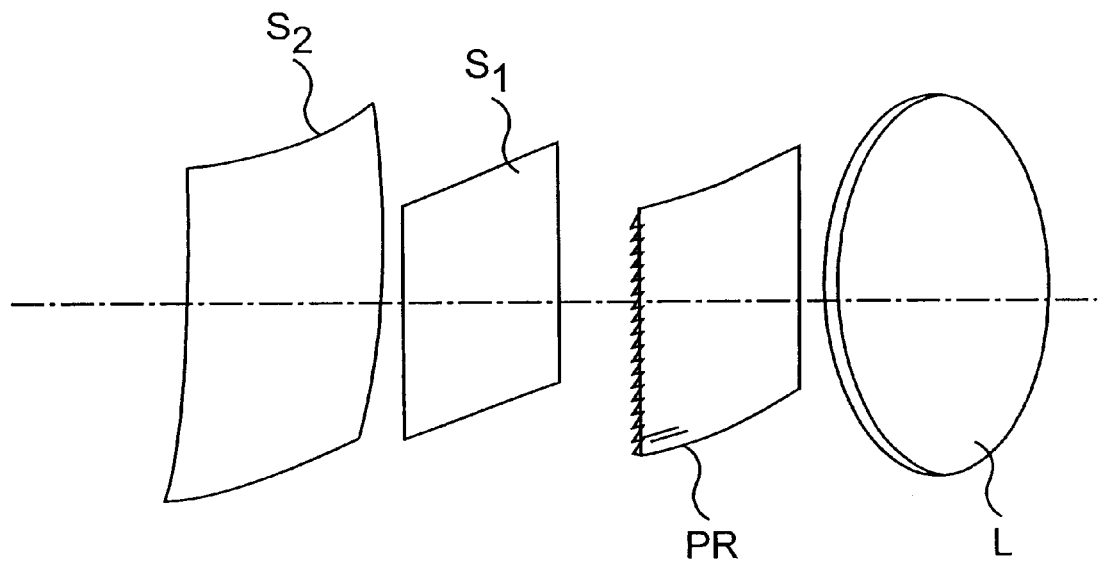
FIG. 5C is an illustration of an embodiment of the present invention with the lens 4 and the curved prismatic screen "PR" in place.

FIG. 5C illustrates a design configuration similar to that shown in FIG. 5B, but the prismatic screen PR is curved from side-to-side along the horizontal axis. To accommodate the curved prismatic screen PR, the lens L is changed from spherical to non-spherical, and is designed to follow the curve of the prismatic screen. This arrangement corrects image distortions for an increased angle of viewing of the image.

Figure 5D:
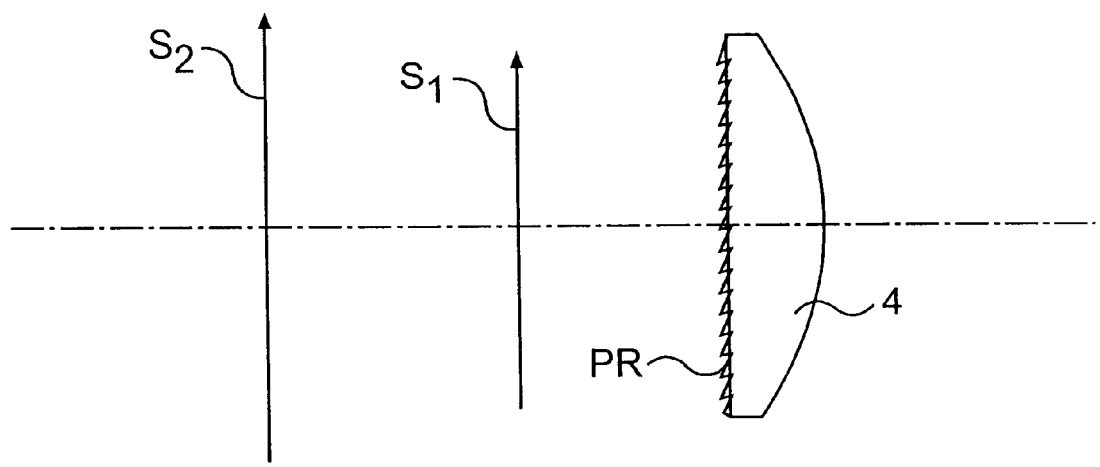
FIG. 5D is an illustration of an embodiment of the present invention with the lens 4 and the prismatic screen "PR" applied to the plano surface of lens 4.

FIG. 5D illustrates a side view of another configuration similar to the arrangement of FIG. 5B. As shown in FIG. 5D, the prismatic screen PR may be applied directly to the plano surface of the plano convex lens L by any known technique. For example, the micro prisms may be etched, rolled or milled with high precision directly in the surface of the lens 4. Alternatively, the prisms could be mechanically or chemically attached appropriately to the lens. S1 is the video image, S2 is the magnified video image.

Figure 5E:
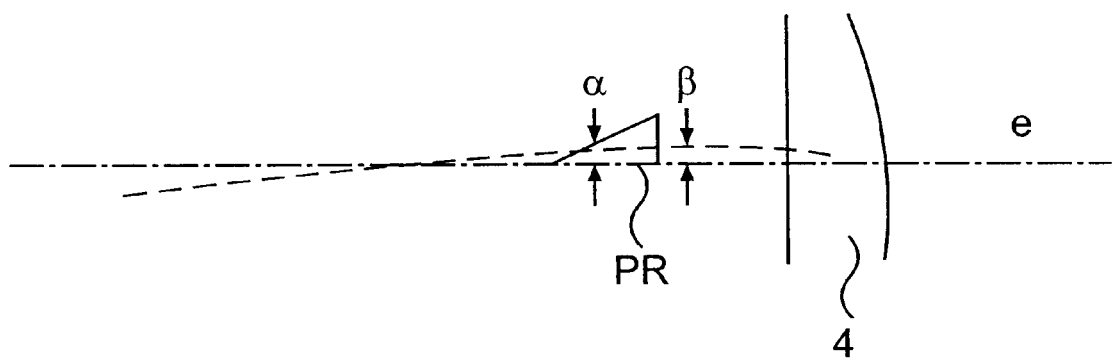
FIG. 5E is an illustration of an embodiment of the present invention with the light pass "e" passing the lens L4 and the single prism of the prismatic screen "PR"

FIG. 5E illustrates the light beam path being directed by the lens 4 and by a single prism section of the prismatic screen PR. The light beam from the lens 4 enters the prism on the angle beta, thereby modifying the prismatic screen's design angle alpha, according to the focal length and the refraction index of the lens 4.

Figure 5F:
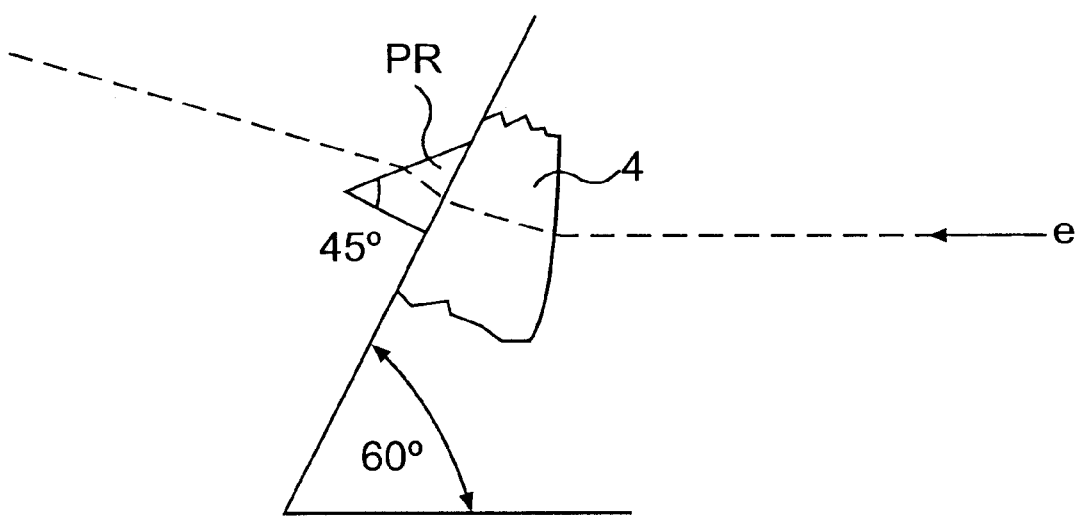
FIG. 5F is an illustration of an embodiment of the present invention wherein the light path "e" passes angled lens 4 and a single prism of a prismatic screen PR laminated to the lens.
Figure 5G:
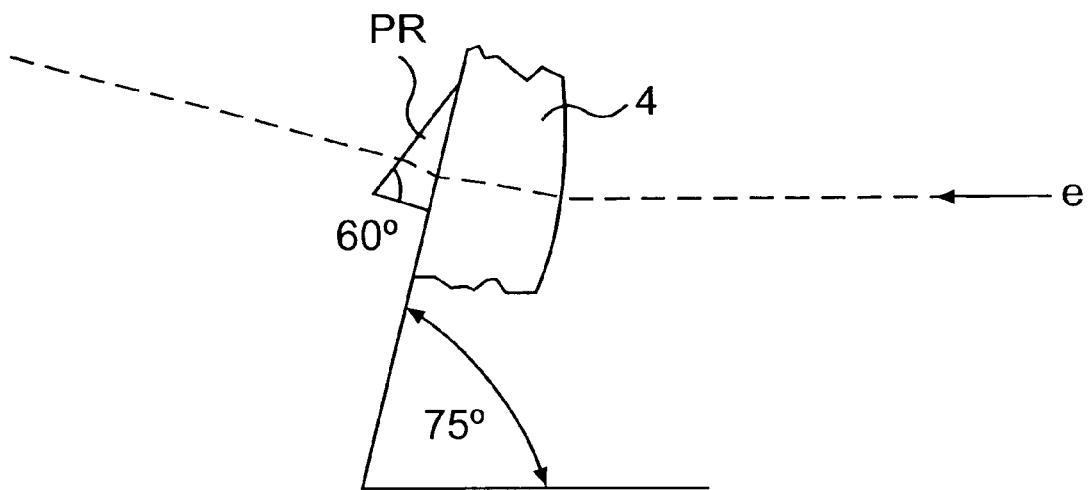
FIG. 5G is another illustration of an embodiment with a prismatic screen laminated to the lens 4, wherein the angles of the prism and the lens 4 have been changed from those of FIG. 5F.

FIG. 5F shows a section of lens 4 which is laminated, cemented, rolled, etched or milled directly to the prismatic screen PR. For clarity, only a section of the prismatic screen is illustrated. The prismatic screen has a prism angle of 45 degrees and the plano surface of the lens 4 is tilted 60 degrees from the viewing axis. FIG. 5G illustrates an alternative embodiment wherein the prismatic screen PR has a prism angle of 60 degrees and the piano surface of the lens is tilted 75 degrees from the viewing axis. Assuming a horizontal viewing axis, the lens 4 is preferably placed in a more upright position as the prism angle increases.

FIGS. 6A, 6B and 7, show different designs of the lens 4. FIG. 6A illustrates the same lens 4 described in connection with the system of FIG. 5B. In FIG. 6B, the lens 4, instead of being made from BK7 glass (having a refraction index of 1.5163), is made with SK16 glass which has a higher refraction index of 1.6204. The lens also can be made from acrylic and polycarbonate plastic materials having a relatively high index of refraction. By using a material with a higher refraction index the center thickness (FIG. 6B) and therefore the weight of the lens can be reduced.

FIG. 7 illustrates a design of a hollow piano convex lens which is similar to the lens in FIG. 5B. The lens is manufactured as an empty, molded, cut and polished element which is then filled with a high refractive index liquid and sealed. Even with difficulties in sealing the edges to prevent leaking of the high index liquid, this design is still cost efficient and reduces the weight of the entire system.

Figure 8:
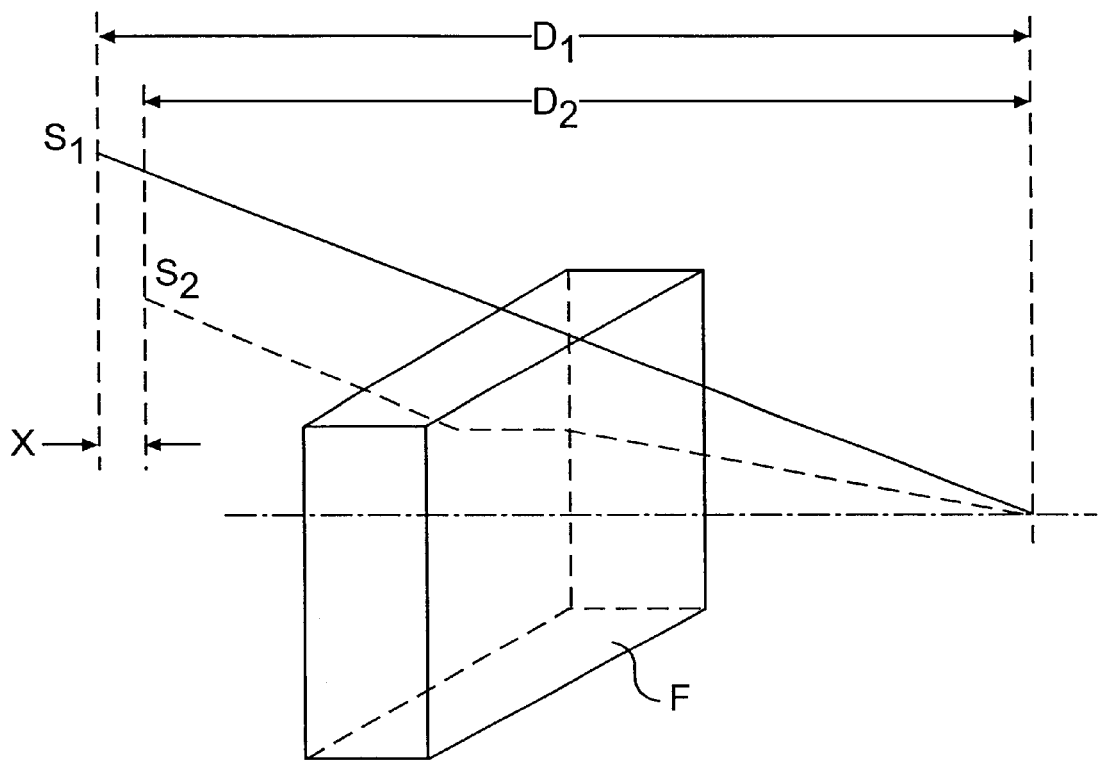
FIG. 8 is an illustration of the present invention with the lens 4 replaced by a parallel transparent plate.
Figure 8A:
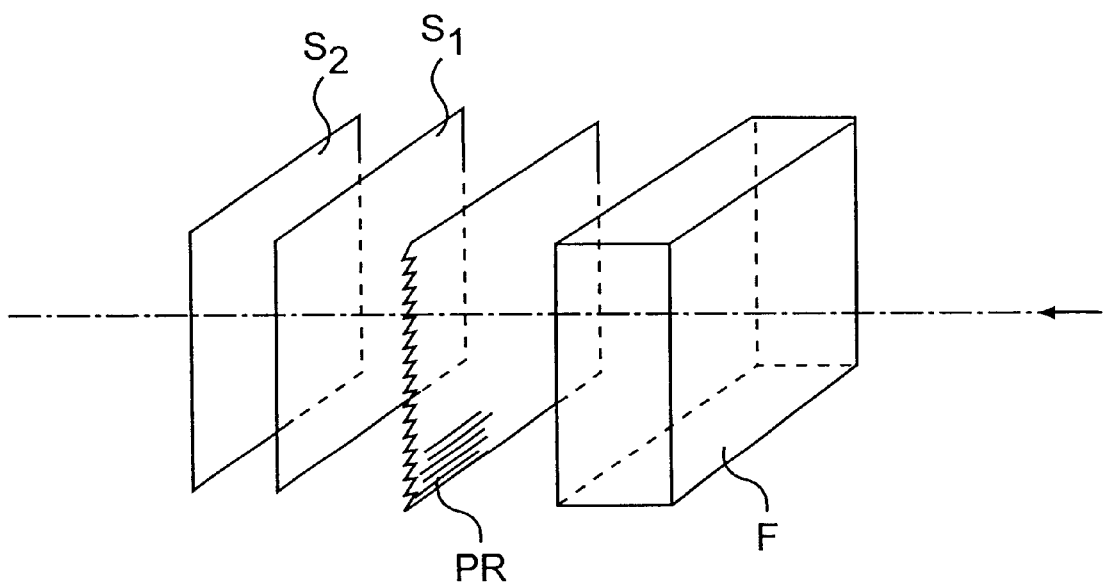
FIG. 8A is an illustration of an embodiment of the present invention with the prismatic screen "RP" placed behind the transparent plate.

Referring now to FIG. 8, when magnification of the video image is not desired or needed, the lens 4 may be replaced with an optically flat plate F having a thickness, for example, of 1 inch. The thick plate operates in a manner similar to the lens 4 by shortening the length of the light beam passing through the transparent plate by approximately ⅓ of the glass thickness; $X=D_1-D_2$. As illustrated in FIG. 8A, the virtual image S2 appears in front of the video screen S1. As with the systems utilizing the piano convex lens, the system of FIG. 8A causes a focus and convergence displacement which enhances the depth cues of the viewed image.

Figure 9:
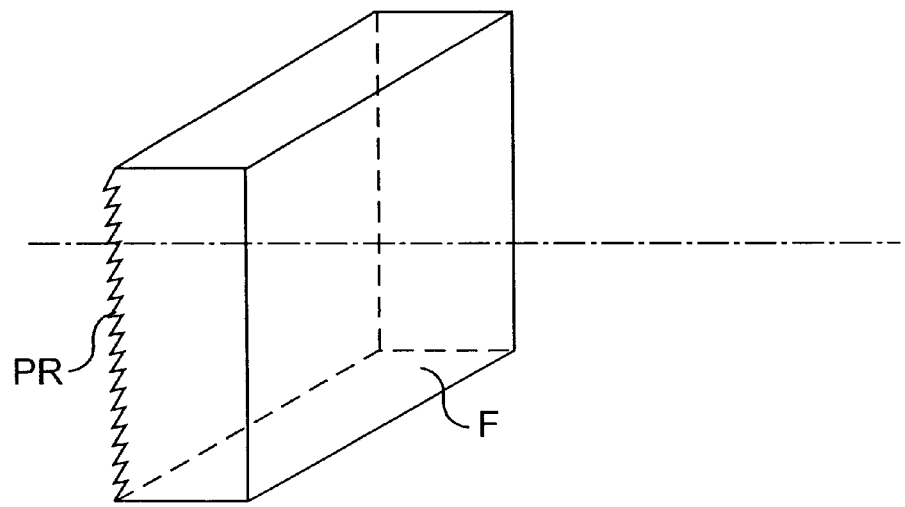
FIG. 9 is an illustration of the present invention with the prismatic screen "PR" attached to the parallel transparent plate.
Figure 9A:
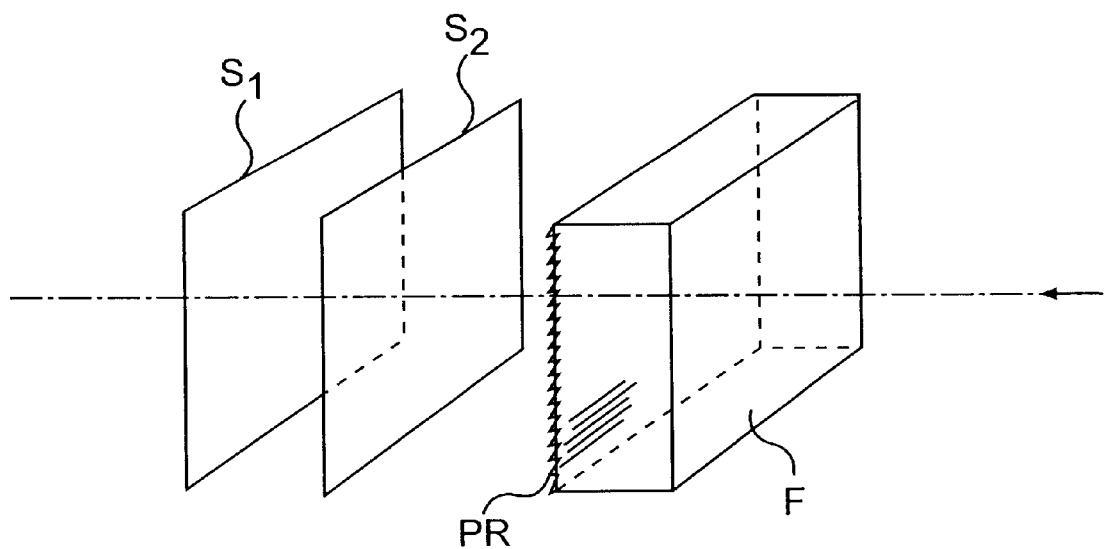
FIG. 9A is an illustration of the present invention with the parallel transparent plate demonstrating how the viewers eyes see the virtual video image S2, which appears in front of the video screen S1.
Figure 10:
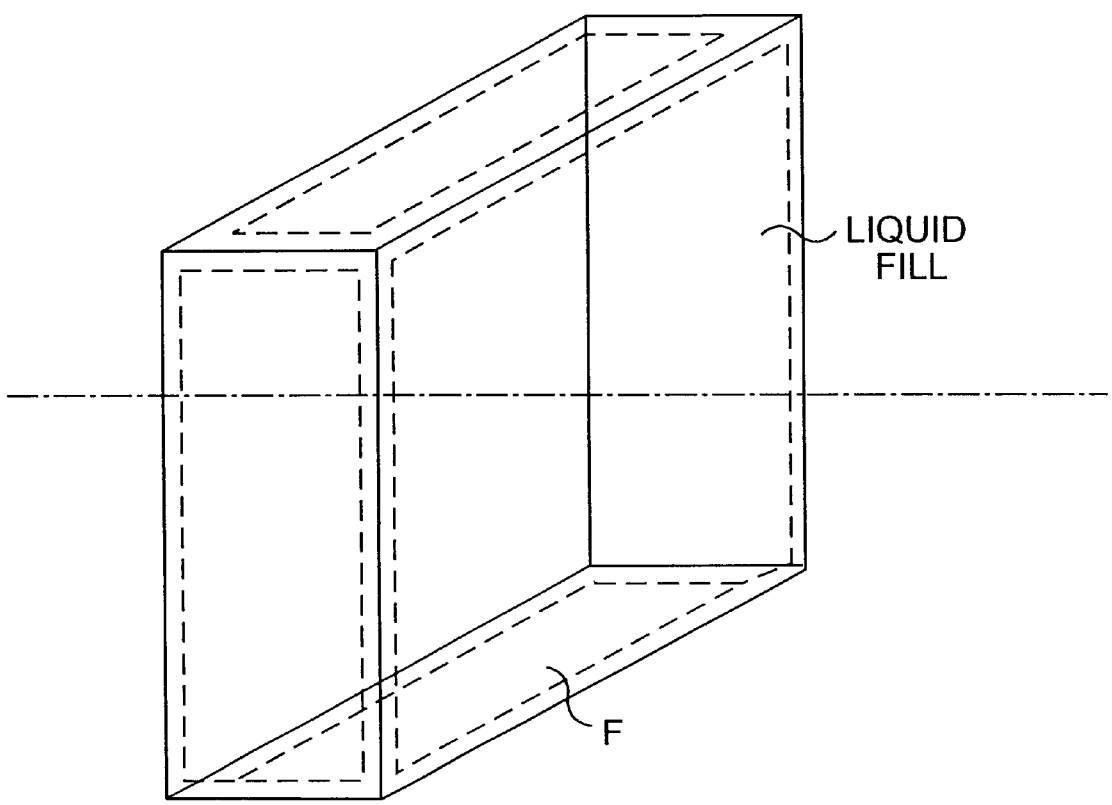
FIG. 10 is an illustration of the present invention with the parallel transparent plate which is hollow and is filled with a liquid high refraction index filler.

FIGS. 9 and 9A illustrate the plate from FIG. 8 with the prismatic screen surface PR, applied to the flat surface of the transparent plate F. FIG. 10 shows the optically flat plate replaced by a hollow molded or cut plate that is filled with a high refraction index liquid and sealed.

Use of an aspherical lens in the present invention to diminish or remove distortion will now be described in relation to FIGS. 11 through 19.

Figure 11:
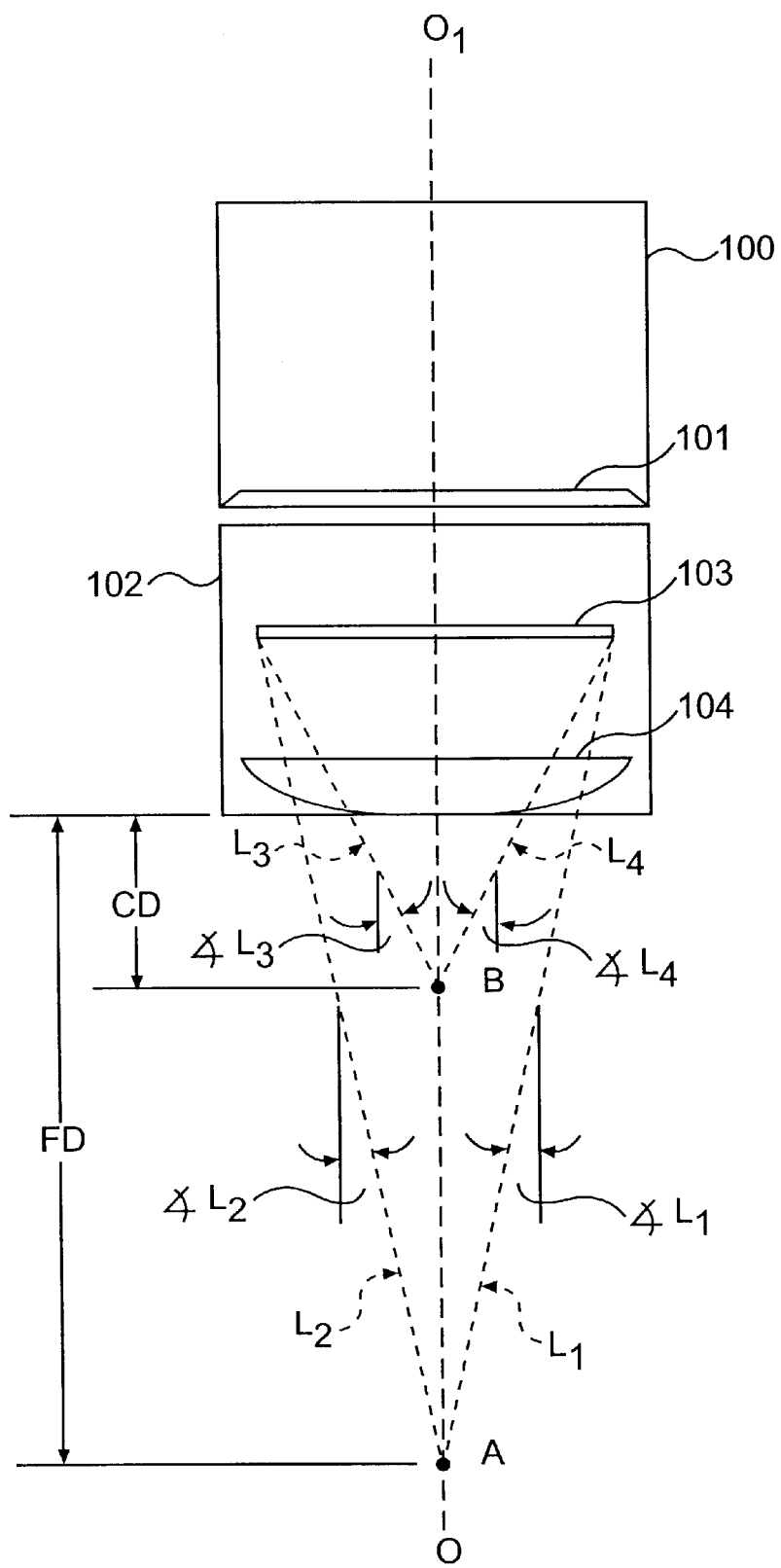
FIG. 11 is an illustration of two viewing points along the center axis of a video monitor with a depth of field prismatic screen and a spherical magnifying lens attached thereto.

FIG. 11 illustrates a top view of one embodiment of the depth of field viewing apparatus of the present invention, comprising video monitor 100, video monitor screen 101, prismatic screen housing 102, prismatic screen 103 and spherical magnifying lens 104. FIG. 1 also illustrates two separate viewing points, A and B, along the center axis O-O1 of the device. Viewing point A is at a distance FD from spherical magnifying lens 104. Viewing point B is at a distance CD from lens 104.

A viewer at viewing point A would see light beams along paths L1 and L2 exiting the spherical magnifying lens 104 at angles <L1 and <L2, respectively. A viewer at viewing point B would see light beams along paths L3 and L4 exiting the spherical magnifying lens 104 at angles <L3 and <L4, respectively. Because the lens is spherical and these viewing points are on the center axis of the device, the angles created by light beam paths L1 and L2 are equal. Similarly, the angles created by light beam paths L3 and L4 are equal. Thus, the magnification of those light beams along those paths by the spherical magnifying lens is equal and the viewer sees little or no image distortion due to the lens.

Figure 12:
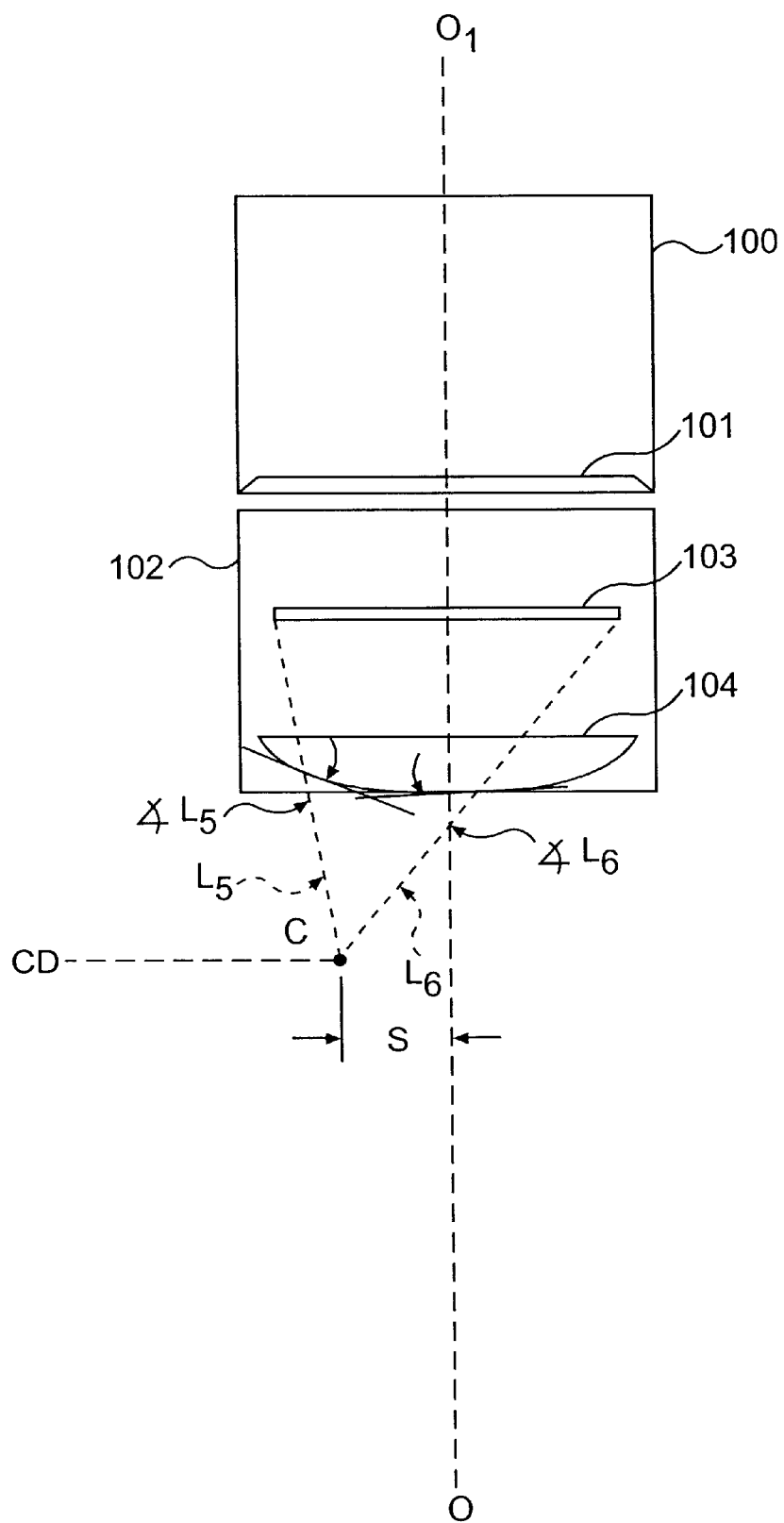
FIG. 12 is an illustration of a viewing point shifted to one side of the center axis of a video monitor with a depth of field prismatic screen and a spherical magnifying lens attached thereto.

FIG. 12 illustrates the device of FIG. 11, again having video monitor 100, video monitor screen 101, prismatic screen housing 102, prismatic screen 103 and spherical magnifying lens 104. FIG. 12, however, shows viewing point C at a distance CD from the magnifying lens 104 and shifted a distance S to the left of center axis O-O1. A viewer at point C sees light beams exiting the spherical lens 104 along paths L5 and L6 and creating angles <L5 and <L6, respectively. Unlike light viewed at points A and B as described with respect to FIG. 11, angles <L5 and <L6 are not equal. The magnification of light along paths L5 and L6 is therefore different and may cause significant image distortion.

Figure 13:
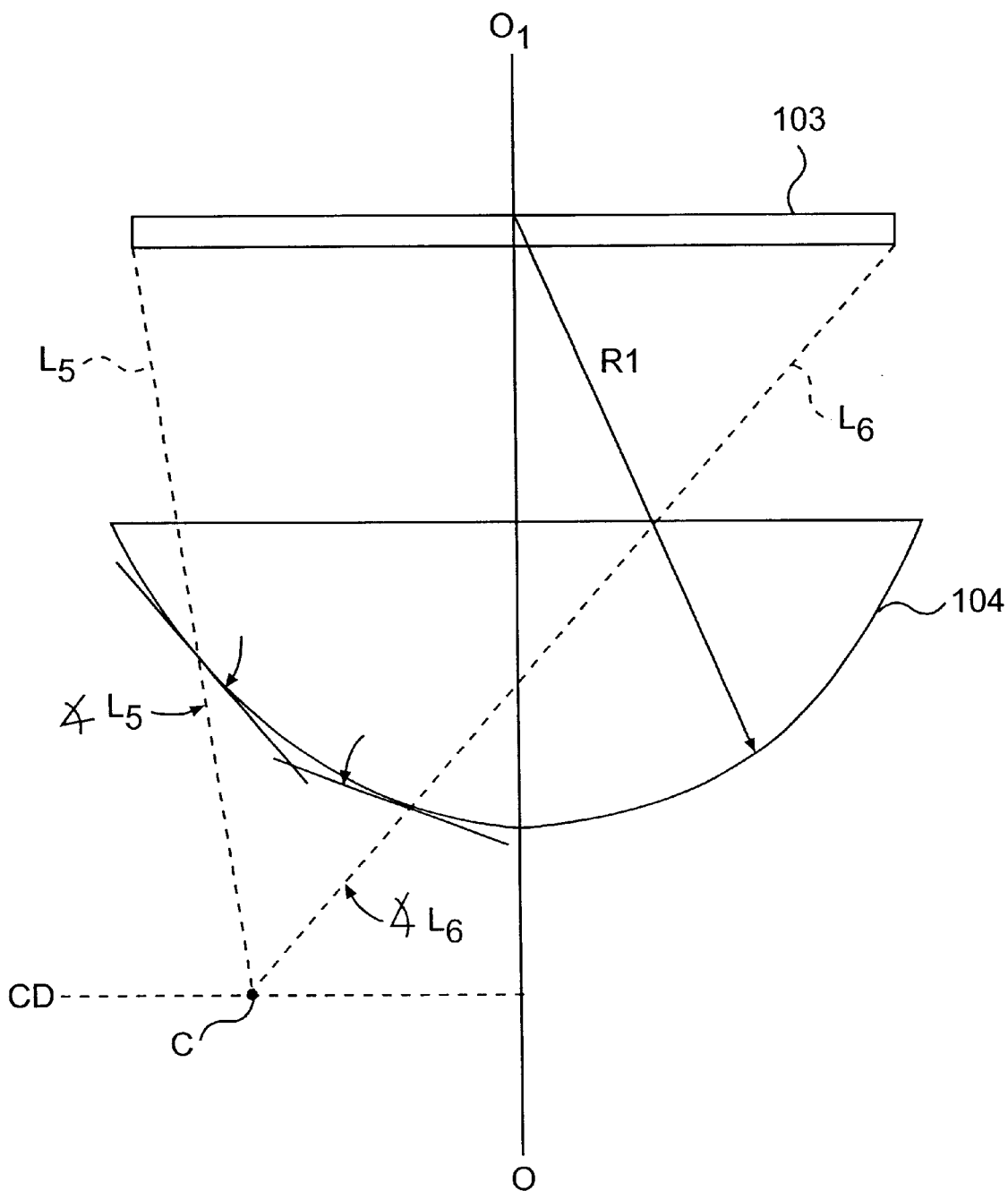
FIG. 13 is an illustration of a viewing point shifted to one side of the center axis of a depth of field prismatic screen and an adjacent spherical magnifying lens.

FIG. 13 is a more detailed view of the spherical magnifying lens 104 and prismatic screen 103 of FIGS. 11 and 12. There it can be seen that the curvature of the lens 104 is defined by the radius R1 of that lens and determines the angles <L5 and <L6 associated with light viewed by the viewer at viewing point C. As described above, where <L5 and <L6 are different, the image seen by a viewer at point C may be distorted.

Figure 14:
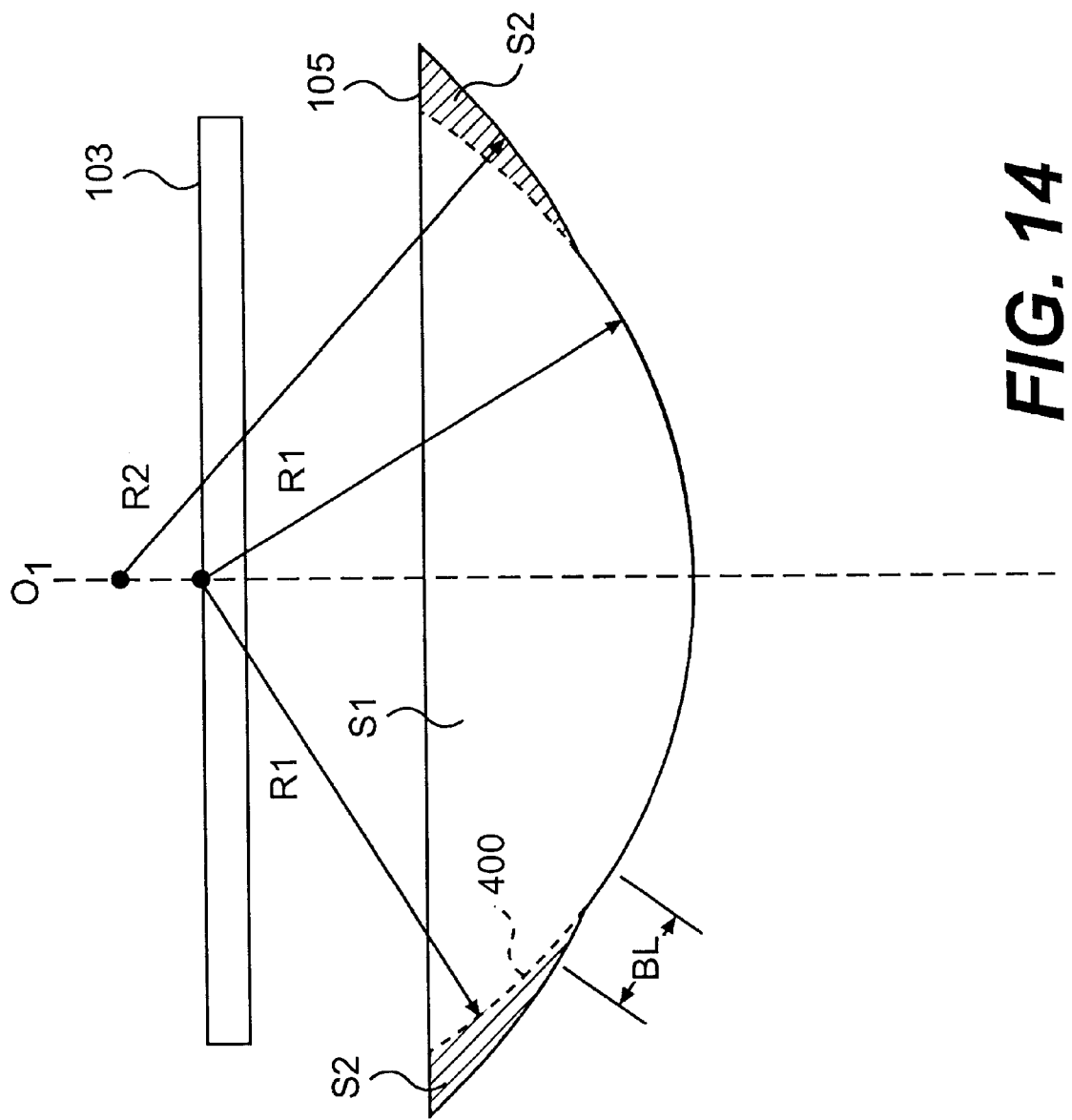
FIG. 14 is an illustration of a depth of field prismatic screen and an adjacent aspherical magnifying lens.

An advantageous way to avoid or minimize this problem is to replace the spherical magnifying lens 104 of FIGS. 11 through 13 with an aspherical lens defined by multiple radii. FIG. 14 illustrates such an aspherical lens 105 along with prismatic screen 103 and having center axis O-O1. In one embodiment, aspherical lens 105 magnifies the image created by the screen 1 to 2 times without distortion. Aspherical lens 105 is made up of center section S1 and side section S2. The curvature of the lens along the center section S1 is defined by radius R1, which is the same radius that defines spherical magnifying lens 104 in FIGS. 11 through 13. The curvature of the lens along the side section S2 is defined by radius R2, which most advantageously is 10 to 50 percent greater than radius R1 (as indicated by dotted line 400, which depicts what the curvature of a spherical lens defined by radius R1 would be in section S2).

Over a portion of the lens, denoted as BL in FIG. 14, the radius of the curvature of the lens will be transitioning, or blending, from R1 to R2. This blending will take place over only a small portion of the lens, and is defined by a succession of, for example, three or four radii of increasing magnitudes between R1 and R2. Thus, the actual radius of curvature at any given point in portion BL will be between R1 and R2 and will change over a small portion of the lens.

The aspherical lens 105 is described as being defined by only two principal radii (R1 and R2) for purposes of clarity of description so that the invention is not obscured. However, the present invention is not limited to an aspherical lens with only two principal radii. The invention could be practiced with a lens having more than two such radii, though at a greater cost and complexity of manufacture.

Figure 15:
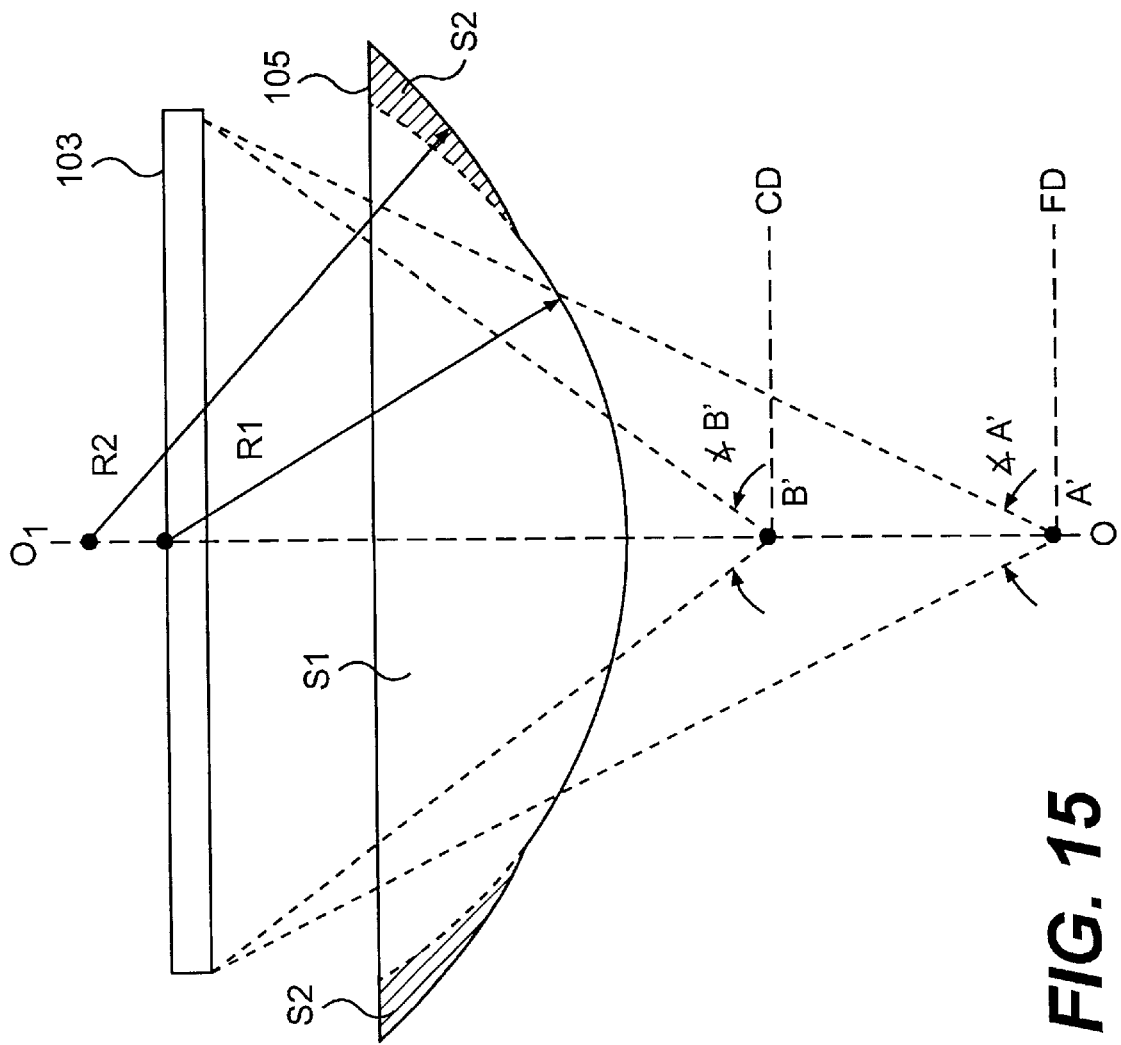
FIG. 15 is an illustration of two viewing points along the center axis of a depth of field prismatic screen and an aspherical magnifying lens.

Referring now to FIG. 15, aspherical lens 105 and prismatic screen 103, along with center axis O-O1 are shown. Here, viewing points A' and B' are shown at distances FD and CD from the lens, respectively. In one embodiment, the far distance (FD) center axis viewing point is 9 feet and the close distance (CD) center axis viewing point is 3 feet. By this it is meant that the dimensions of the lens are chosen such that a viewer a distance FD from the lens can clearly view the image solely through portion S1 of lens 105, as can a viewer at distance CD from the lens. Determining exactly what lens dimensions are necessary to achieve this will depend on the characteristics of the specific device being used, such as diameter and magnification of lens, and is well within the competence of the ordinarily skilled artisan. As can be seen from the Figure, viewing angle <A' at point A' and viewing angle <B' at point B' are such that the image on the screen is viewed substantially through the center section S1 of the lens, defined by radius R1. Thus, little or no image distortion is perceived by the viewer.

Figure 16:
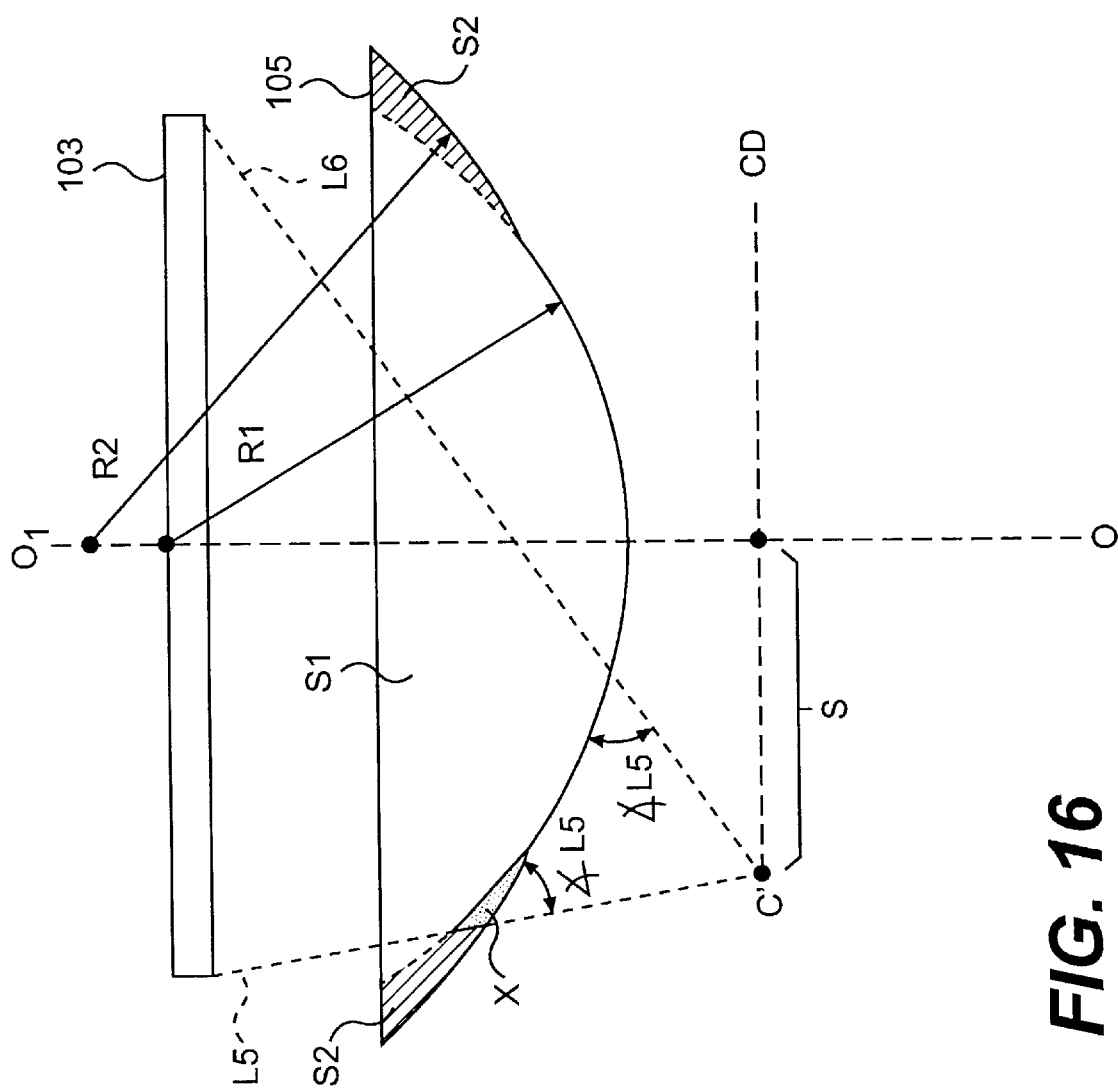
FIG. 16 is an illustration of a viewing point shifted to one side of the center axis of a depth of field prismatic screen and an aspherical magnifying lens.

Referring now to FIG. 16, aspherical lens 105 and prismatic screen 103, along with center axis O-O1 are shown. Here, however, viewing point C', which is at distance CD from the lens 105 and shifted a distance S to the left of center axis O-O1, is depicted. As shown, light beams along path L6 pass through center section S1, defined by radius R1, of the lens and form angle <L6 upon exiting. Light beams along path L5, however, pass through side section S2, defined by radius R2, and form angle <L5 upon exiting.

As can be seen by shaded area X, the angle <L5 formed by using the aspherical lens is less than that angle would have been had a spherical lens defined only by radius R1 been used. Thus, the differences between angles <L5 and <L6 are diminished as are the differences between the magnifications of light along paths L5 and L6 thereby minimizing or removing image distortion caused by varying magnifications.

Figure 17:
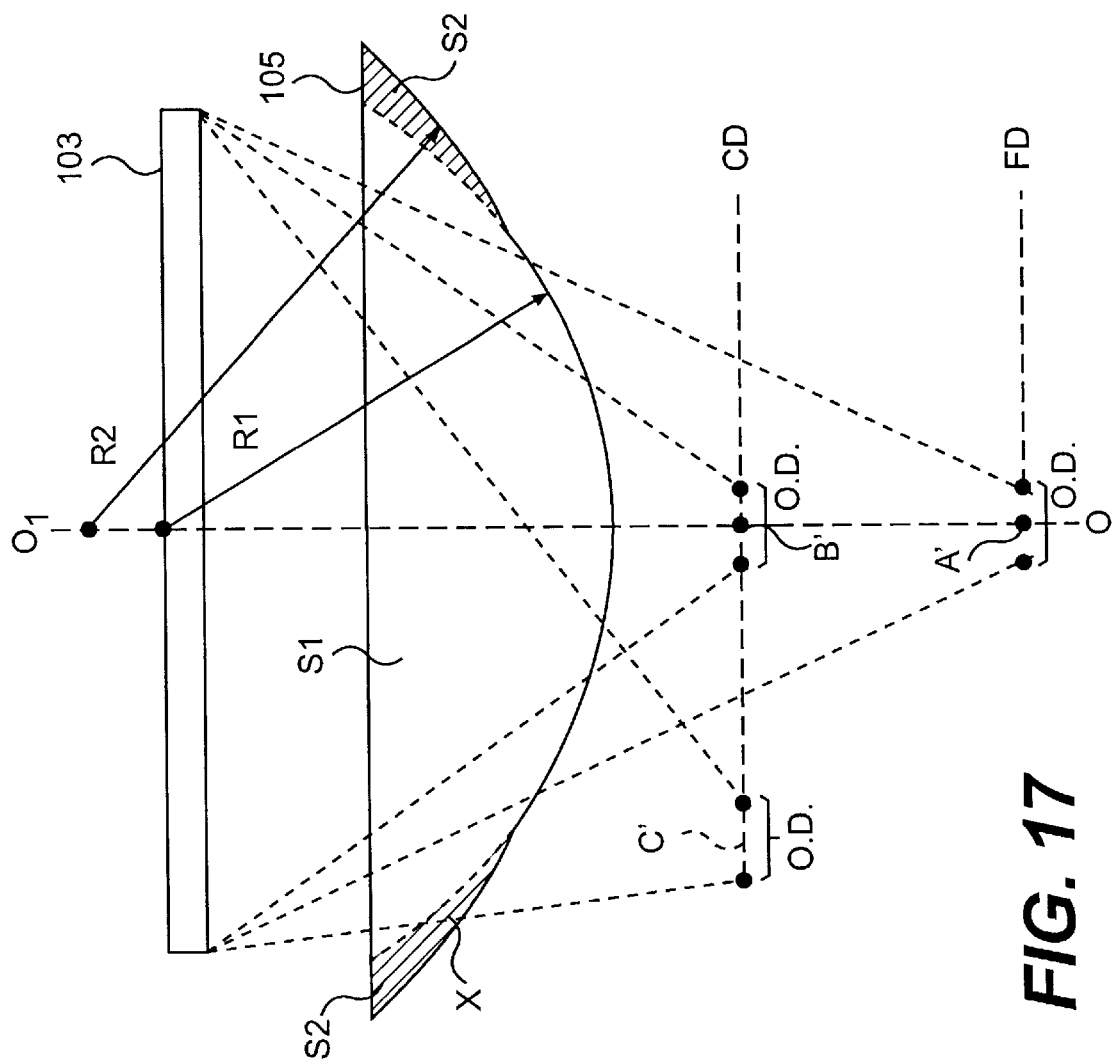
FIG. 17 is an illustration of two viewing points along the center axis of a depth of field prismatic screen and an aspherical magnifying lens as those viewing points are related to left and right eye inter ocular distance.
Figure 17A:
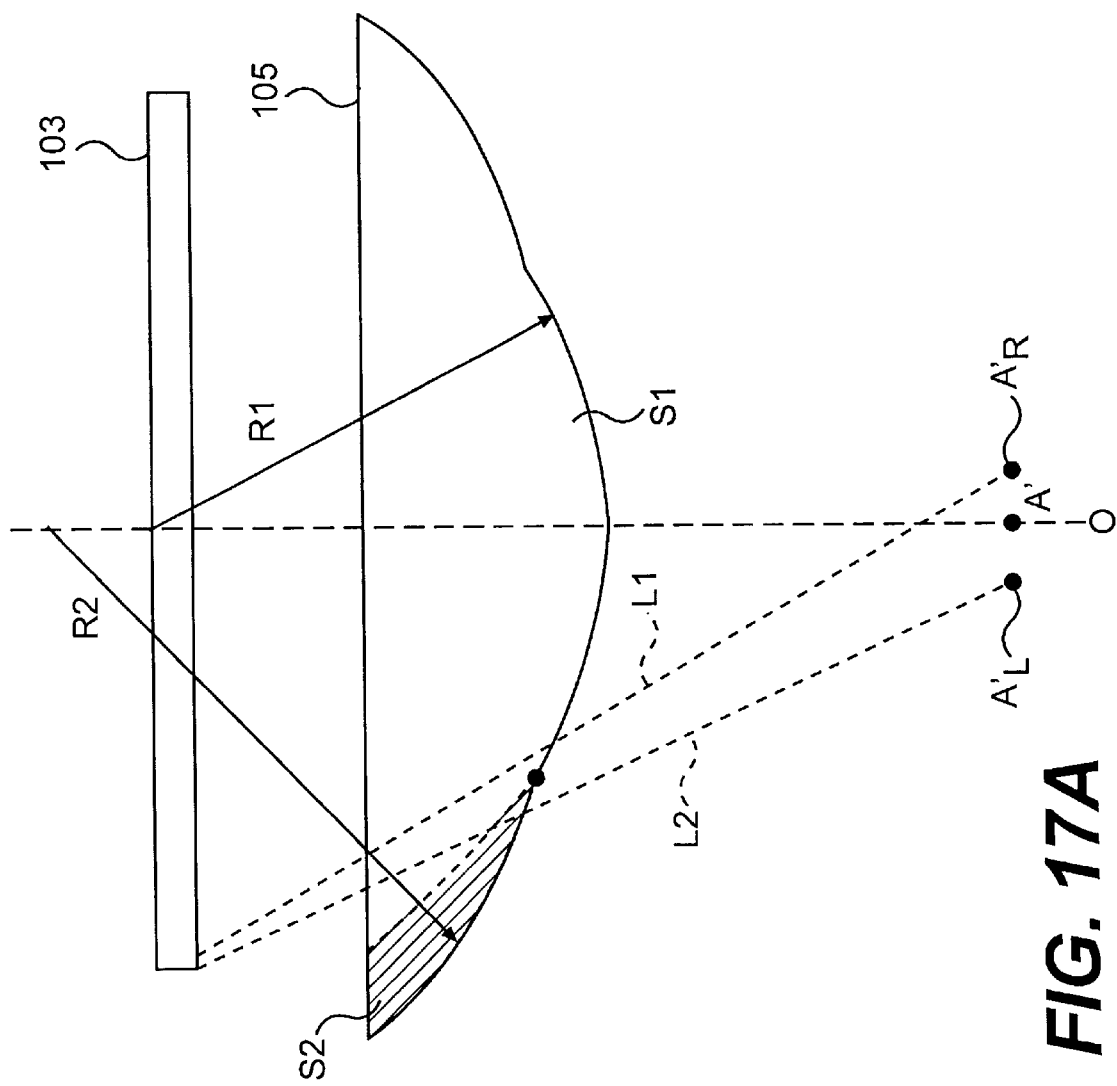
FIG. 17a is an illustration of an exemplary aspherical lens designed to account for the interocular distance between the eyes of a viewer.

FIG. 17 illustrates the aspherical lens 105, screen 103 and center axis O-O1. FIG. 17 also illustrates interocular distance O.D. at points A', B' and C'. That is, when designing an aspherical lens to be used with the present invention, one must take into account the interocular distance between the eyes of the viewer when choosing the dimensions of the lens so that the image being viewed is not seen through one section of the lens (e.g., S1) by one eye and through another section of the lens (e.g., S2) by the other eye, thereby causing distortion of the image. Such a situation is shown in FIG. 17a with respect to viewing point A'. There, the light along path L1 passes through portion S1 of lens 105 and is seen by the viewer's right eye at point $A_R'$. The light along path L2 passes through portion S2 of lens 105 and is seen by the viewer's left eye at point $A_L'$. This may cause the viewer to perceive a distorted image. In order to avoid this situation, the two-point eye viewing distance should be 20% of the lens diameter.

Figure 18:
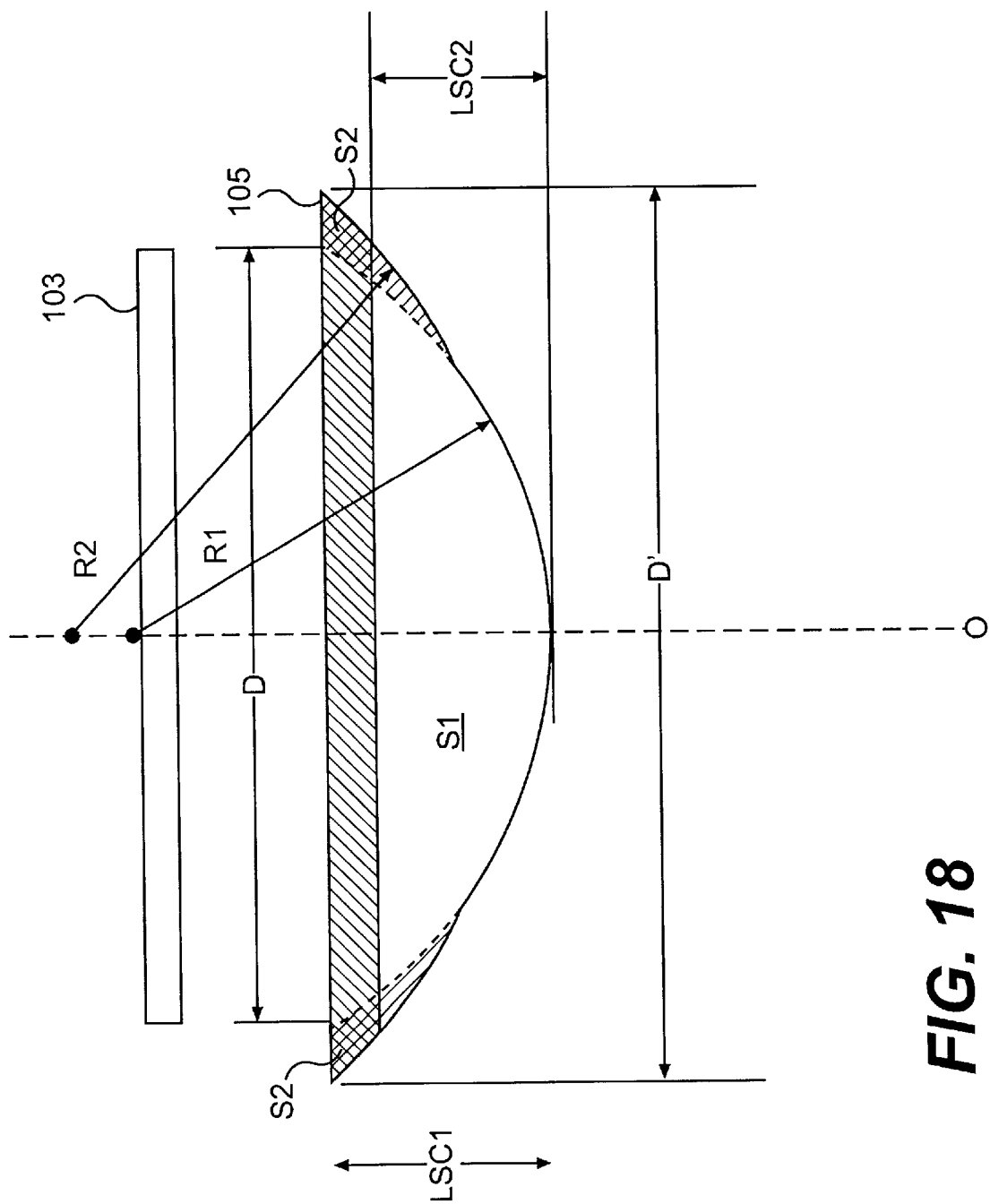
FIG. 18 is an illustration of the reduction in lens thickness corresponding to use of an aspherical magnifying lens in the present invention.

FIG. 18 illustrates another advantage of the use of an aspherical lens in the apparatus of the present invention. FIG. 18 again shows aspherical lens 105 and prismatic screen 103, along with center axis O-O1. Had a spherical lens, defined solely by radius R1, been used, the lens would have been of diameter D and thickness LSC1. An aspherical lens, defined by radii R1 and R2 where R2 is greater than R1, has a diameter of D', even though only diameter D is necessary. This permits use of lens of lesser thickness. That is, an aspherical lens defined by radii R1 and R2 where R2 is greater than R1 need only be of thickness LSC2 to achieve diameter D. This center thickness reduction results in a lens weight reduction, making the device more convenient.

Figure 19:
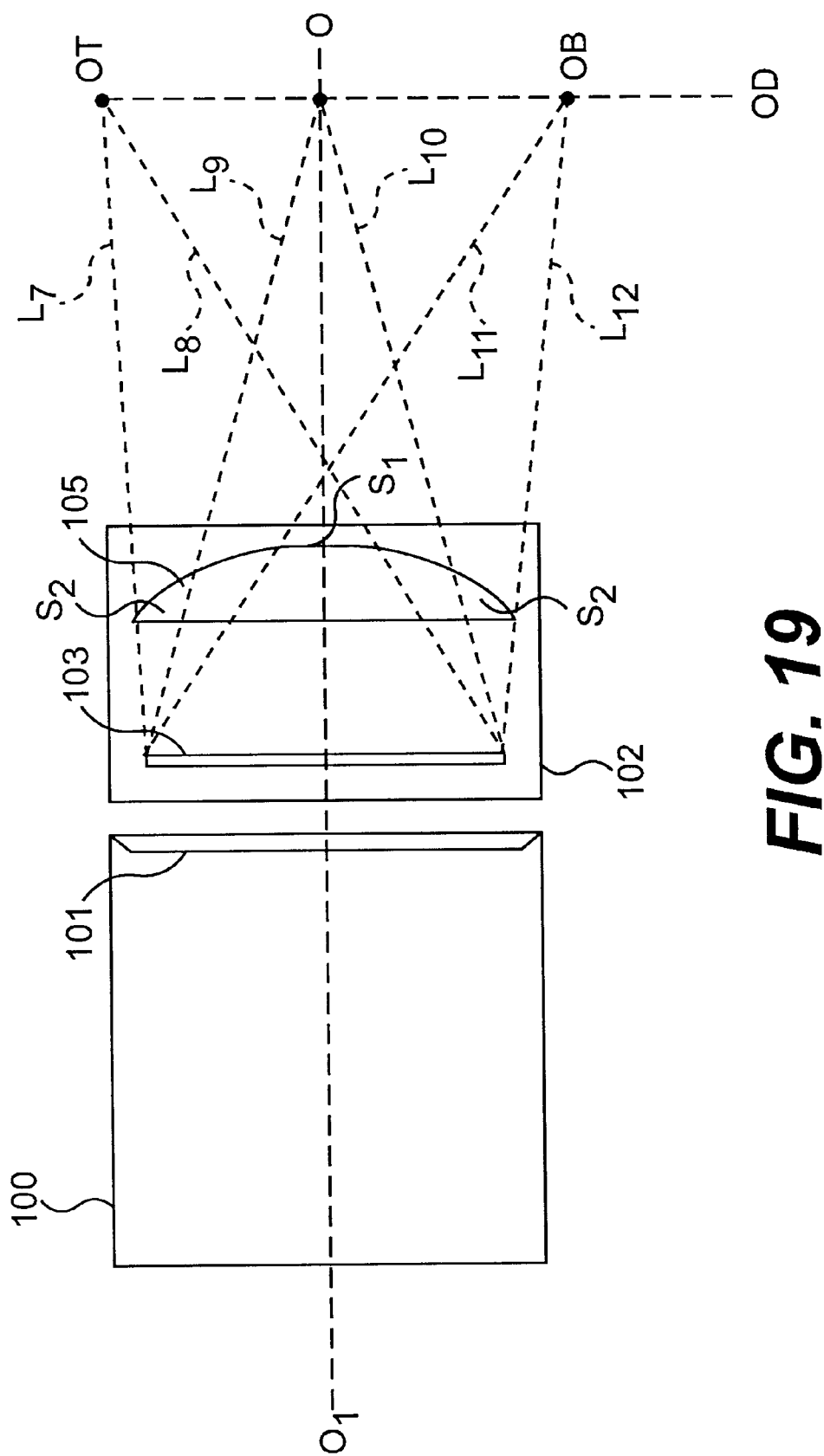
FIG. 19 is an illustration of three viewing points, one along, one above and one below the center axis of a depth of field prismatic screen and an aspherical magnifying lens.

FIG. 19 illustrates a side view of the apparatus of the present invention using the aspherical lens 105 and comprising video monitor 100, video monitor screen 101, prismatic screen housing 102, prismatic screen 103 and aspherical lens 105. FIG. 19 also illustrates center axis O-O1 and three viewing points, O, OT and OB, each a distance OD from the lens. Viewing point O is on the center axis O-O1, while point OT is above the center axis and point OB is below it.

Similar to the situation described above where the viewing point is displaced orizontally from the center axis of the device, FIG. 19 illustrates how use of an aspherical lens in the present invention can minimize or remove image distortion when the viewing point is displaced vertically from the center axis. Specifically, light beams along path L7 and L8 will pass through different sections (S1 and S2, respectively) of aspherical lens 105, just as light beams along paths L11 and L12 will pass through different sections (S1 and S2, respectively) of lens 105. Just as described above, use of an aspherical lens defined by multiple radii will minimize or remove image distortion for viewers at point OT and OB. FIG. 19 also illustrates how light beams along paths L9 and L10 will pass through the same, center section, S1, of lens 105, thus not experiencing distortion.

Figure 20:
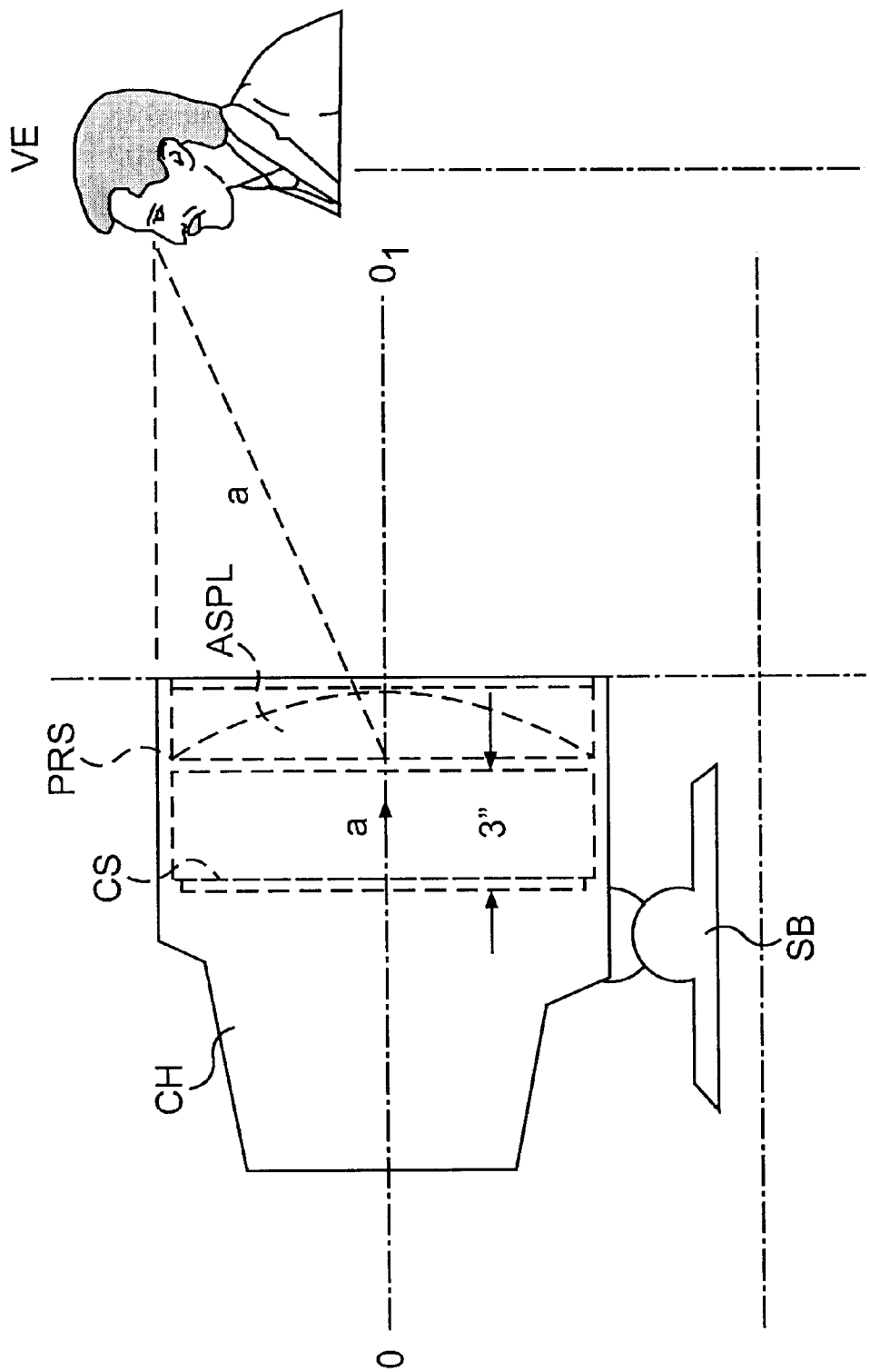
FIG. 20 shows one example of the prismatic screen of the present invention used in the context of a computer monitor.

FIG. 20 shows one example of how the present invention can be used in the context of a computer monitor. The system is used most advantageously by disposing the prismatic screen and lens at close distance from the computer screen by keeping the optical housing dimensions as small as possible and extending the housing from the front of the computer monitor screen at a small distance. For example, FIG. 20 shows a conventional CRT display combined with aspherical lens ASPL, which is similar to lens 105 described above, and prismatic screen PRS. In this example, the lens and screen are placed at a distance of 3 inches in front of the computer screen CS, though distances as great at 12 inches, and perhaps more, could be utilized. Computer screen CS is housed in computer housing CH, which also houses the CRT and associated circuitry (not shown) of the conventional computer display. Such circuitry is well known in the art and will not be further described here.

In the example shown in FIG. 20, image a is generated by the CRT within housing CH in a conventional manner and is transmitted along axis O-O1. The image can be seen from many different viewing points, including the point designated VE shown positioned above the top edge of the computer's screen and inclined at an angle of 30 degrees. Note that different viewing angles are possible by tilting the computer on its base SB. In the example shown, prismatic screen PRS and aspherical lens ASPL compensate for the looking down viewing angle in the manner described above with respect to FIG. 19.

Figure 21:
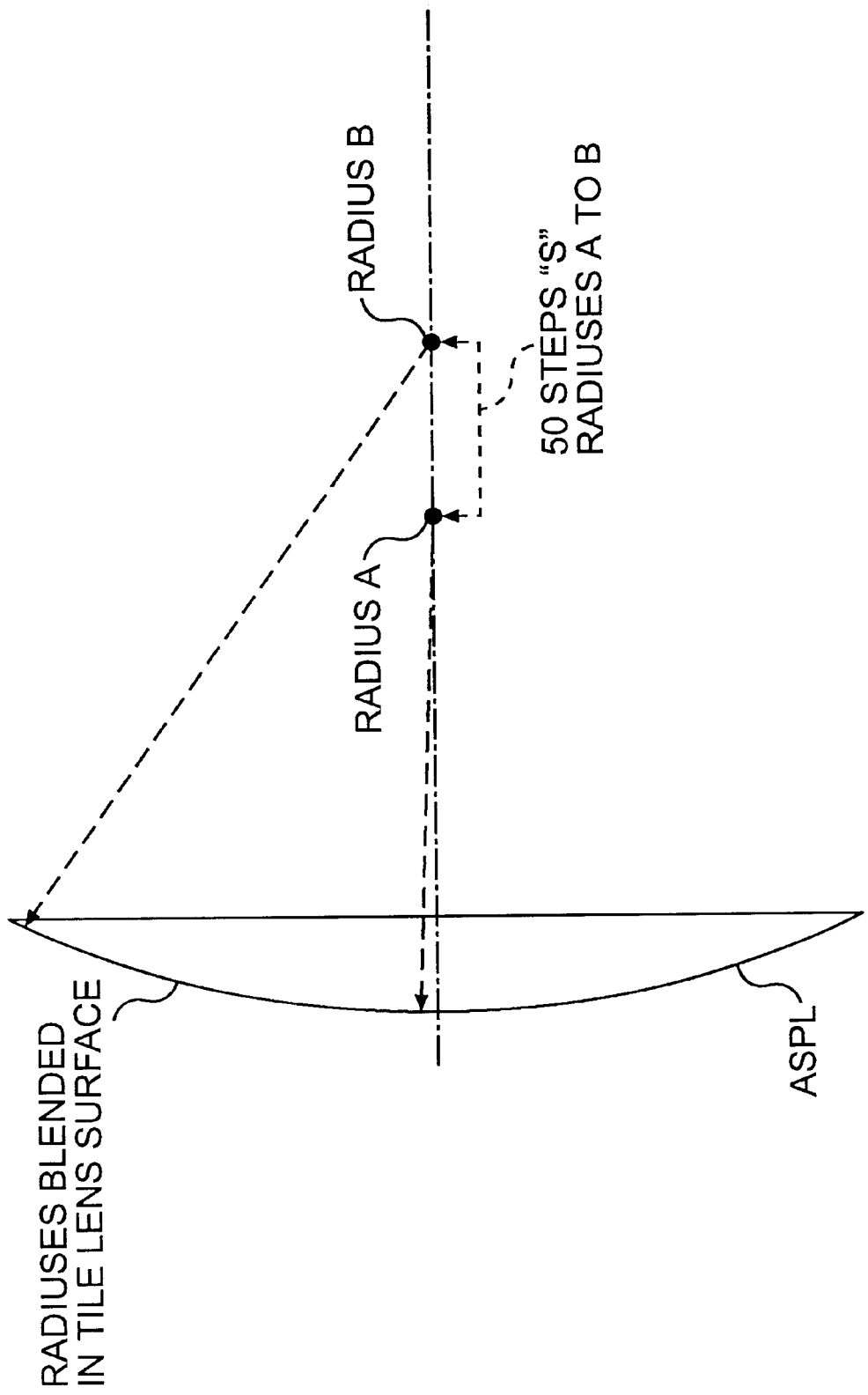
FIG. 21 shows an aspherical lens having defined therein 50 or more radii that blend on into the other.

FIG. 21 shows an aspherical lens ASPL constructed of 50 or more radii that blend one into the other, as described above. The radius "A" changes into radius "B" from the center of the lens to its edge, with each intermediate radius being measured from a different one of the steps S shown. When the invention is used in the computer monitor context, radius "B" is advantageously chosen to be approximately 10% to 40% longer than radius "A" due to the desire to make the system as compact and lightweight as possible.

Figure 22:
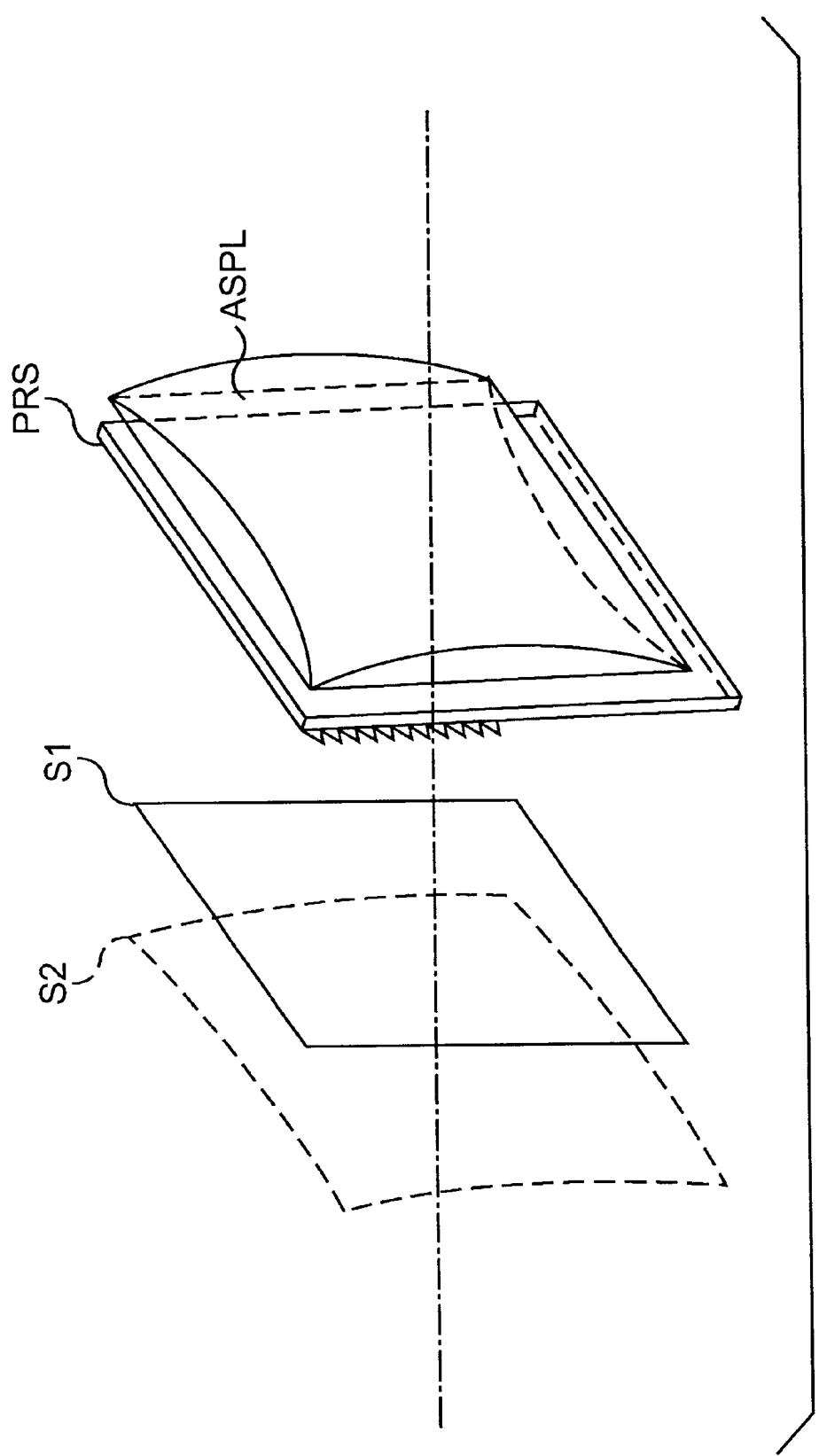
FIG. 22 shows an aspherical lens magnifying a computer image.

FIG. 22 shows the aspherical lens ASPL magnifying computer image S1 so that it appears as virtual curved image S2. Curving the image S1 into S2 separates the images focus from convergence. Combined with the effects of the prismatic screen PRS, described above, this allows a viewer to perceive computer image depth cues with much greater clarity. The aspherical lens in this example is designed to magnify the computer image 25% or more with no distortion. The prismatic screen PRS reduces the scanning lines, or the pixel elements of the computer image, and enhances the resolution of the image, which helps to eliminate eyestrain. Thus, images are not only magnified but contain more detail.

A method of making an aspherical lens of the above-described type, hereafter referred to as a stepped aspherical lens SASPL, will now be described with reference to FIGS. 29–36. First, a material from which the stepped aspherical lens SASPL is to be manufactured is formed into a block using a mold. Exemplary materials for forming the stepped aspherical lens SASPL may include, but are not limited to, BK7 glass (having a refraction index of 1.5163) and SK16 glass which has a higher refraction index of 1.6204. However, it is preferable and may be advantageous to use high-purity acrylic or polycarbonate plastic materials having a relatively high index of refraction.

Figure 29:
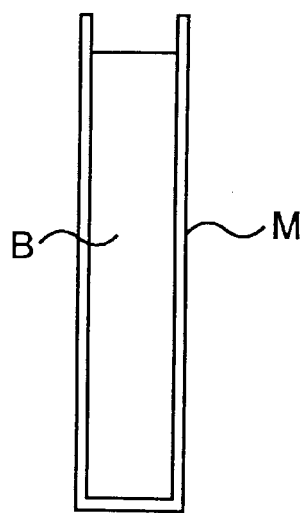
FIG. 29 is a side elevational view of a molding step in a method for forming a stepped aspherical lens in accordance with the present invention.

In one embodiment, a vertical mold M, having a glass lining (not shown) to minimize contamination, is preferably used to form a block B, as illustrated by FIG. 29. A selected material is poured into the mold M and allowed to set from approximately 20–50 days, depending on the material. This step allows for any impurities to settle to the bottom of the mold M. The block B is then removed from the mold M and cut according to the dimensions of a video image screen with which the stepped aspherical lens SASPL is to be used.

Figure 30:
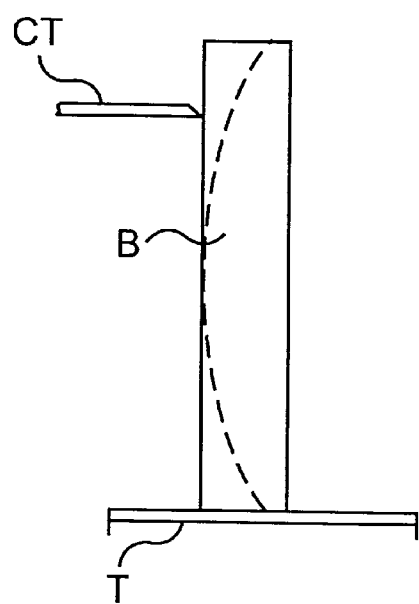
FIG. 30 is a side elevational view of a cutting step in a method for forming a stepped aspherical lens in accordance with the present invention.

Referring next to FIG. 30, the block B is then secured to a table T for milling by a cutting tool. While illustrated in a vertical position, the block B may alternatively be milled horizontally or otherwise. The table T is preferably a computer numeric control (CNC) table, and the tool a CNC cutting tool CT controlled by a CNC milling machine (not shown). As will be appreciated by those skilled in the art, the CNC milling machine may be programmed as desired to carry out cutting of each of a plurality of radii steps RS to be cut in the surface of the block B, thereby forming a stepped aspherical lens SASPL, as hereinafter described.

Figure 31:
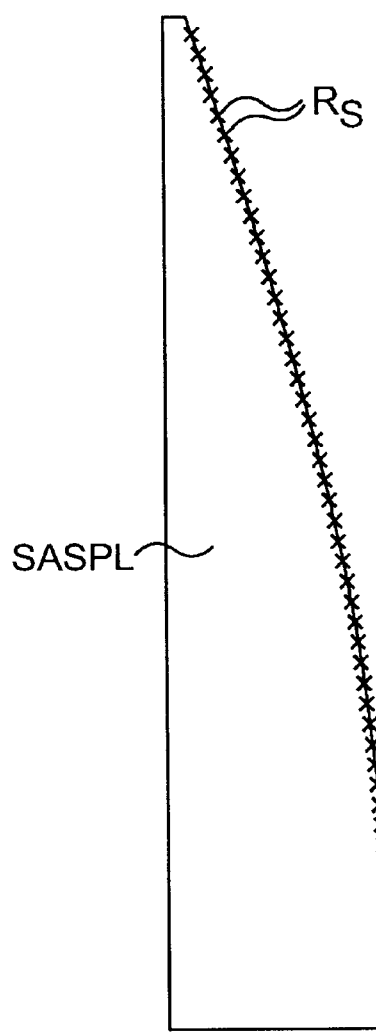
FIG. 31 is an illustration of a preferred step arrangement on a lens in an embodiment of the present invention.
Figure 32:
FIG. 32 is a side elevational view of a stepped aspherical lens of the present invention.

In the exemplary embodiment, the stepped aspherical lens SASPL will have 50 radii steps RS cut into the surface thereof, as indicated by each 'x' in FIG. 31. The radii steps are then cut by the CNC cutting tool CT of the CNC milling machine, as seen in FIG. 32. As the radii steps RS may be cut directly into block B after cutting the same to a desired size, it is not necessary that the block B first be cut into a shape of a spherical lens. Alternatively, as suggested by FIG. 31, the radii steps RS may be cut into a previously-formed lens.

Figure 33:
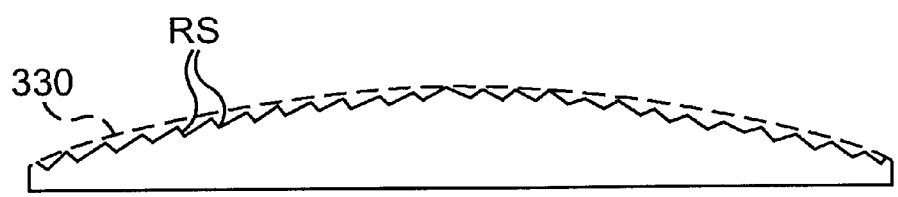
FIG. 33 is a side elevational view of a stepped aspherical lens of the present invention.

As can be better seen in FIG. 33, the CNC milling machine is preferably programmed to cut the radii steps RS such that the stepped aspherical lens SASPL, while termed aspherical, will possess pseudo-spherical qualities as well. As indicated by a dotted line 330, the radii steps RS, cut into the surface of the stepped aspherical lens SASPL along a predefined curved path, will further define a spherical surface having a radius Rs. This pseudo-spherical quality will persist upon a polishing of the steps, discussed below.

Figure 35:
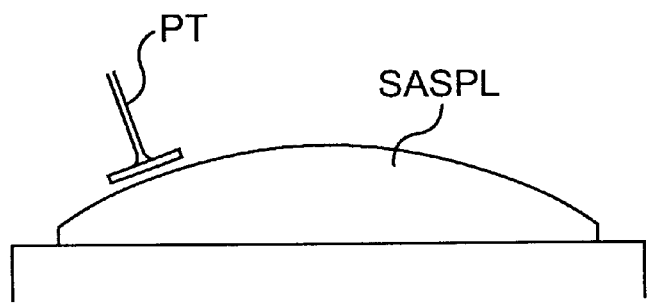
FIG. 35 is a side elevational view of a polishing step in a method for forming a stepped aspherical lens in accordance with the present invention.
Figure 36:
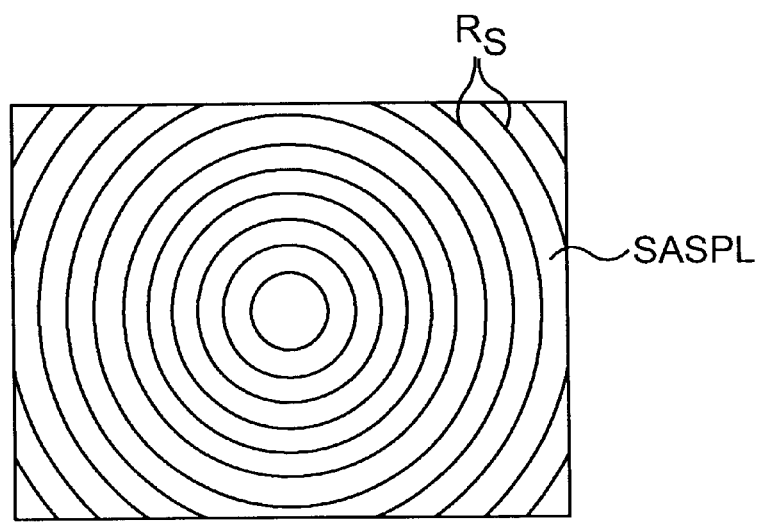
FIG. 36 is a top elevational view of a stepped aspherical lens of the present invention.

Concurrently, the stepped aspherical lens SASPL will possess an aspherical quality resulting from the radii steps RS cut into the surface thereof. Once the plurality of radii steps RS have been cut into the surface of the stepped aspherical lens SASPL, the steps are then polished, rounding them and blending the radii steps RS together such that the individual radii steps RS are no longer visible. The polishing is preferably achieved on a large, 40 inches for example, polishing machine, with the stepped aspherical lens SASPL preferably in a horizontal position, as seen in FIG. 35. The polishing tool PT preferably uses an aluminum oxide polishing disc having approximately a 0.5 micron surface, but may alternatively use any suitable polishing implement. Polishing the individual radii steps RS reduces them to curved portions. As discussed above with reference to FIG. 21, these curved portions have gradually increasing radii which are encountered with travel from a center of the stepped aspherical lens SASPL to its edge. These curved portions of varying radii provide the aspherical quality of the stepped aspherical lens.Referring again to FIG. 34, this SASPL aspherical quality, in conjunction with the pseudo-spherical quality, leads to a separation of the focus and convergence features of a flat image, as perceived by the human brain, leading to enhanced perception of depth cues from the flat image, as previously discussed in detail.

Figure 34:
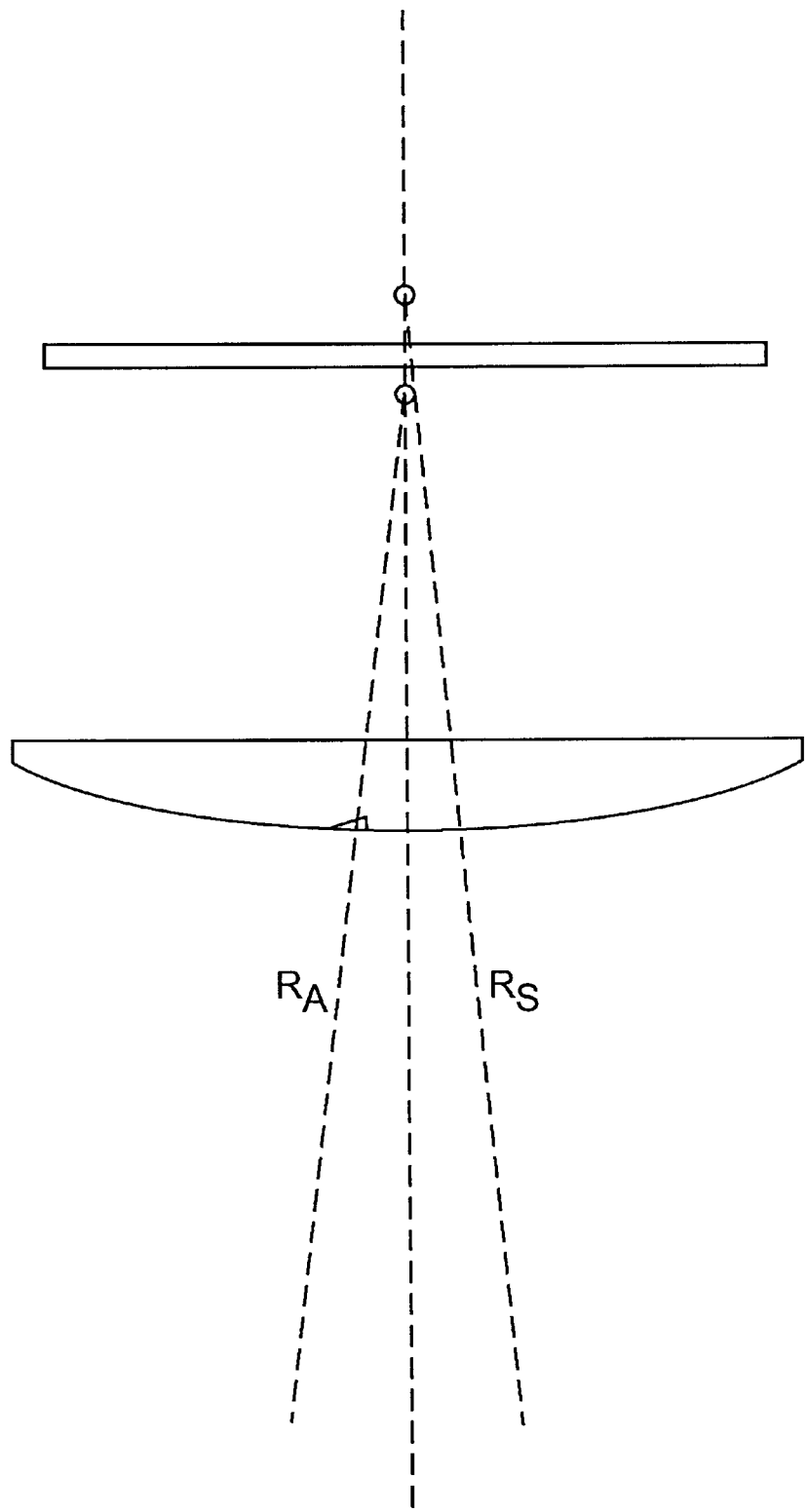
FIG. 34 is an illustration of varying radii of a stepped aspherical lens of the present invention.

Referring to FIG. 34, a radius Rs of the spherical nature of the stepped aspherical lens SASPL is illustrated. Also shown is a radius Ra of one of the plurality of steps that define the aspherical nature of the stepped aspherical lens SASPL While the radii steps RS are illustrated as being cut and polished in a single plane in FIG. 30, it should be recognized that the radii steps RS are formed about a full surface of the stepped aspherical lens SASPL, as can better be seen by reference to FIG. 33.

Figure 23:
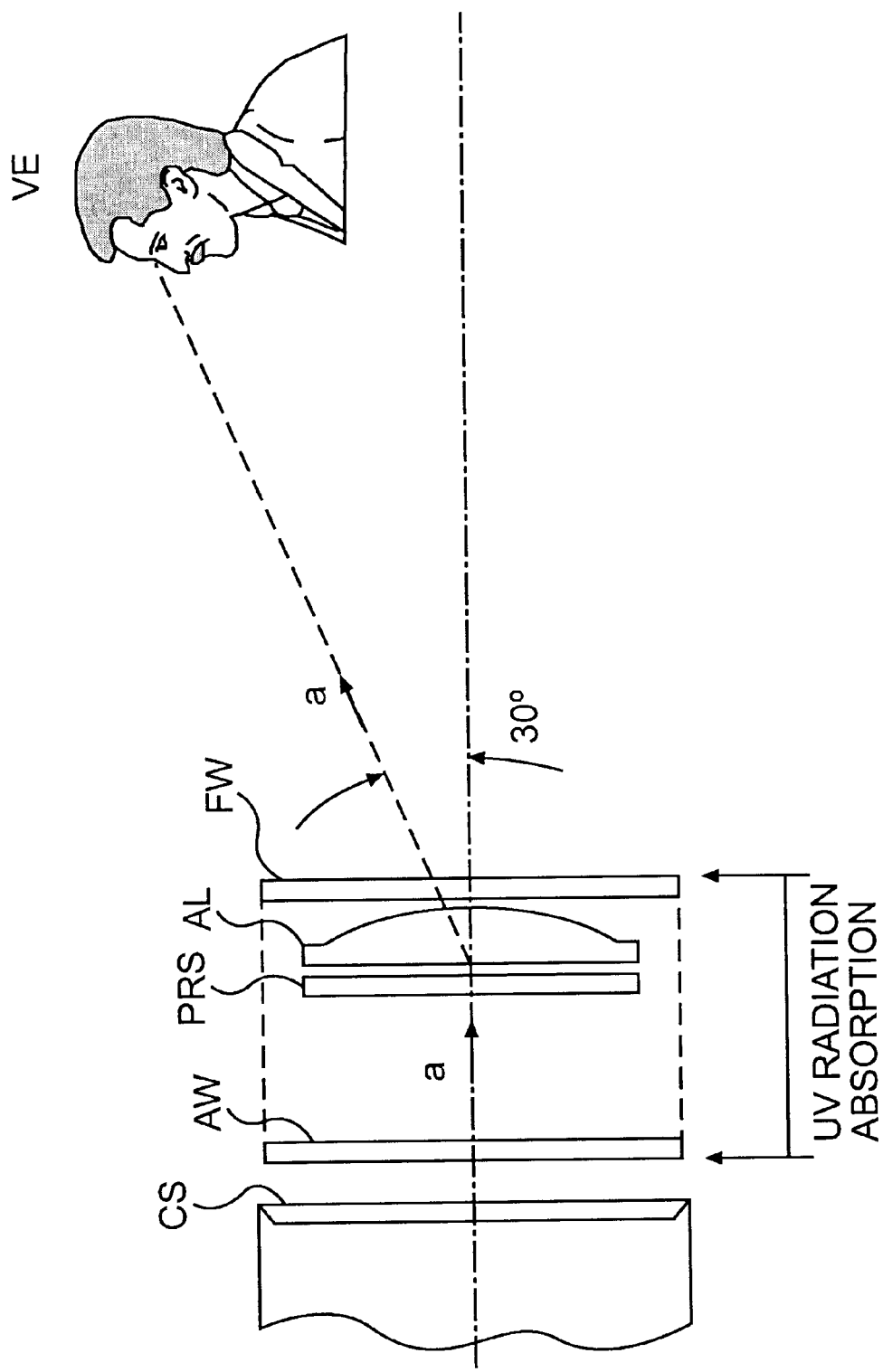
FIG. 23 shows the prismatic screen and aspherical lens placed in front of a computer monitor screen.

FIG. 23 shows the prismatic screen and aspherical lens placed in front of the computer's monitor screen. It has been discovered that these elements work as a UV shield, stopping UV radiation which is harmful for the viewers eyes. This shield also contributes to the elimination of eyestrain. The light beam OL from the computer's screen CS, passing through the rear window RW, the prismatic screen PRS, the aspherical lens AL and the front window FW and is UV radiation free, before reaching the viewers eyes.

Figure 24:
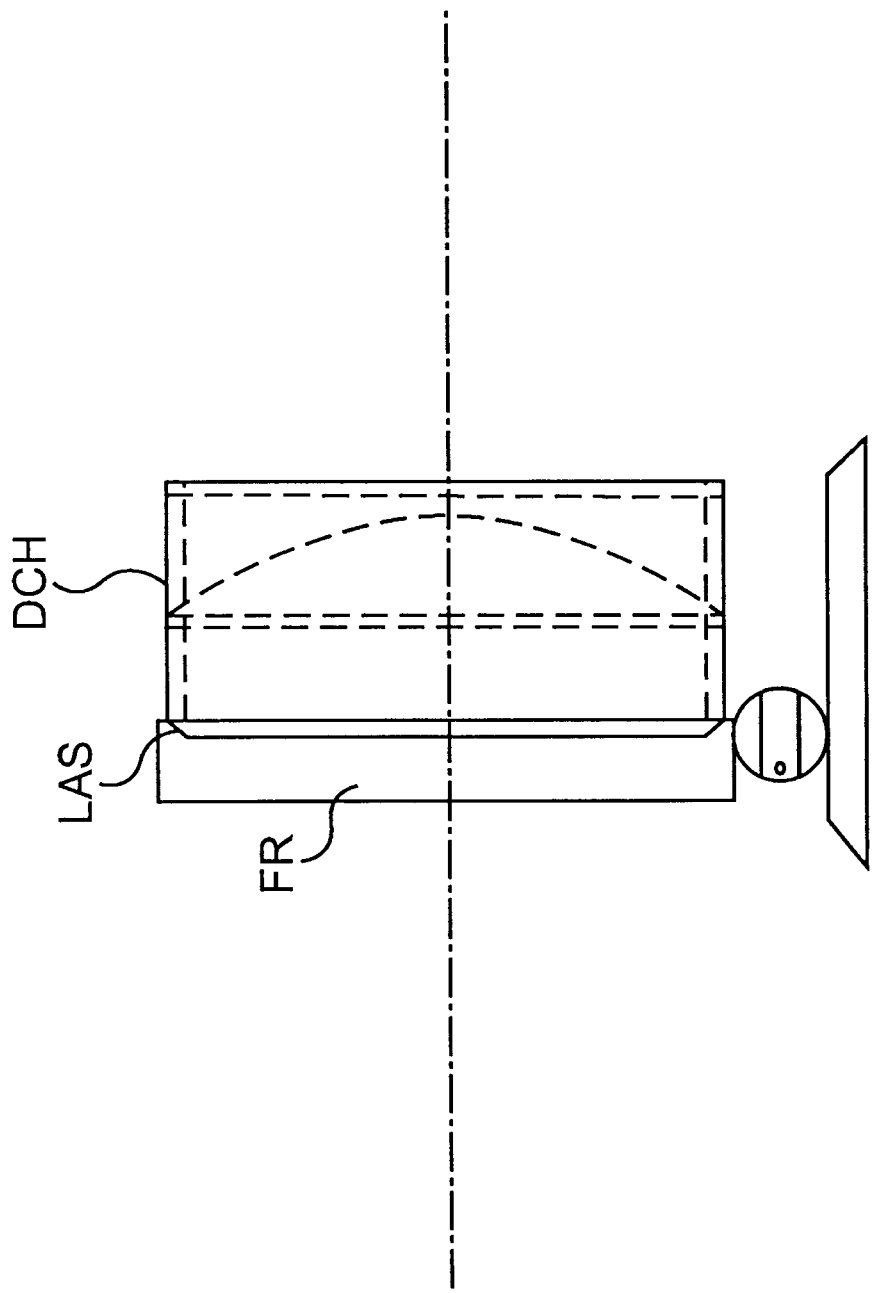
FIG. 24 shows a computer monitor screen framed with a liquid crystal screen.

The system of the present invention can be used in conjunction with all types of computer monitors, including digital high definition and flat liquid crystal models. FIG. 24, for example, shows the liquid crystal screen LQS, framed in the flat computer screen housing FR, without the rear cone shaped tube, which is typical for regular computer screens. The computer housing DCH attached to the liquid crystal screen LQS is designed to be narrow and to fit the flat liquid crystal screen. The liquid crystal computer screen is characterized with better contrast of the image and better image resolution. The computer screen system of the present invention raises the liquid crystal image to a higher quality level, where the image appears in depth, is magnified and has higher image resolution.

Figure 25:
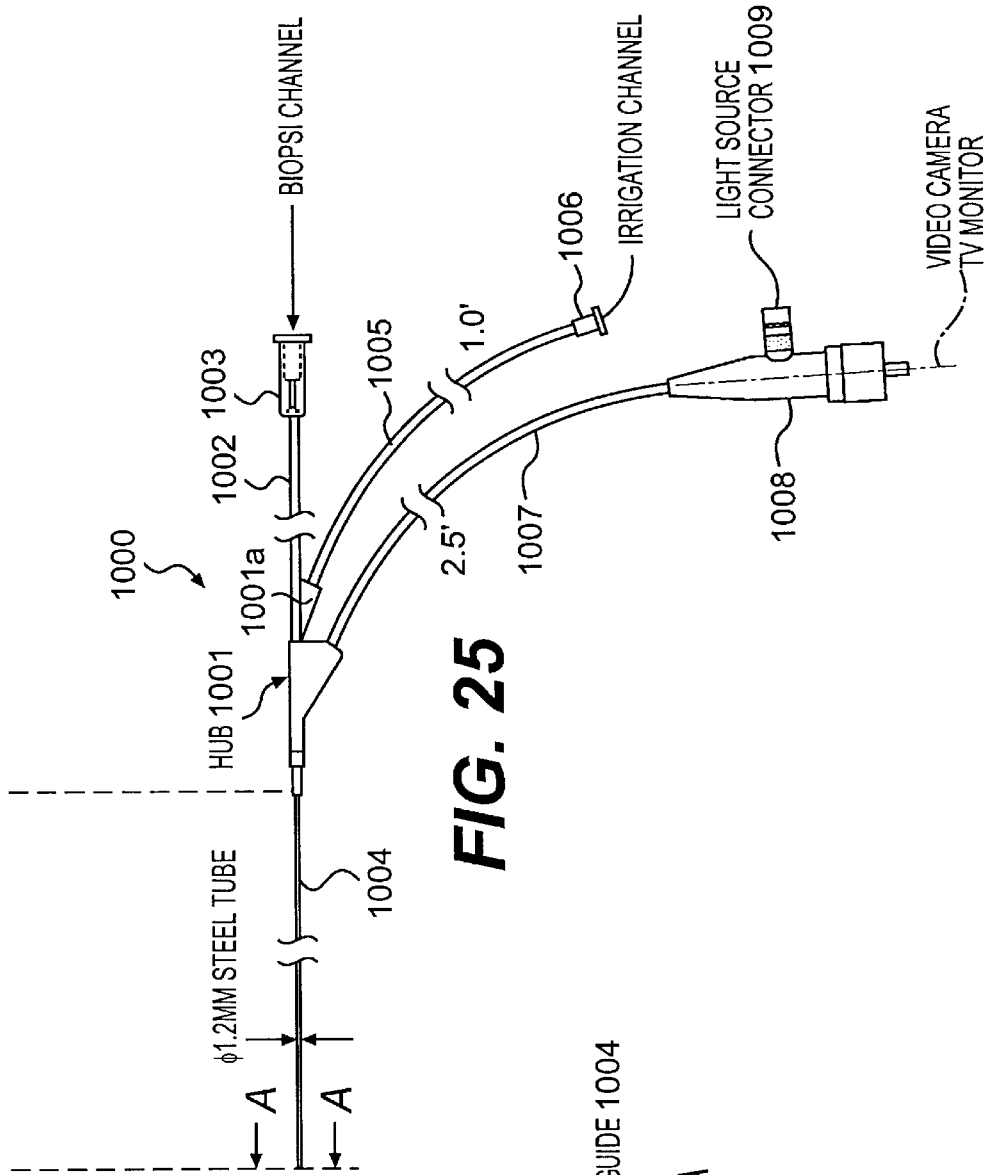
FIG. 25 is a side elevational view of one embodiment of the endoscope of the present invention.

Referring now to FIG. 25, there is shown an embodiment 1000 of the endoscope of the present invention. Endoscope 1000 consists of tube portion 1004, sometimes referred to as a "guide." Tube 1004 is formed to be hollow in that it has a passageway running longitudinally down its length. The passageway includes a sub-passage or smaller tube referred to as the "working channel," described in more detail below. Tube portion 1004 may be a rigid steel tube roughly 30 cm long having an outer diameter of approximately 1.2 mm. For some procedures, it is more appropriate to have a shorter rigid guide, such as one approximately 10 cm long. Tube portion 1004 may alternatively be a flexible tube made of flexible plastic, or some other suitable material, and having a length of approximately 110 cm. This longer, flexible tube is useful in procedures requiring insertion into, for example, blood vessels of the body. The various guides are formed to be interchangeable on endoscope 1000 by unscrewing one guide from hub 1001 and screwing in another.

Endoscope 1000 also includes a hub portion 1001 coupled to a tube portion 1002, and instrument port 1003. Portions 1001 and 1002 and port 1003 can be made of metal or plastic, or some other suitable material, as is known in the art. Each includes a longitudinally formed hollow passageway down its length. Through the hub this passageway, or biopsy channel, is coupled to the working channel of the endoscope. These portions together allow the physician to utilize, for example, a biopsy tube, described in more detail below, inserted through the biopsy channel and the working channel of endoscope 1000 in order to perform various medical procedures, some of which are described in further detail below.

Although not necessary for every embodiment of the invention, FIG. 25 shows endoscope 1000 as including tube portion 1005 coupled to mini-hub 1001a, which is coupled to tube portion 1002, and to irrigation port 1006. In one embodiment, tube portion 1005 is approximately 1 foot long. Portion 1005, mini-hub 1001a and irrigation port 1006 may also be made from any suitable material, such as plastic or metal, though forming them of a flexible material, such as a flexible plastic, makes them somewhat easier to work with. Portion 1005, mini-hub 1001a and irrigation port 1006 are formed such that a passageway runs down their middle, referred to here as the "irrigation channel," which passageway is coupled to the biopsy channel of tube portion 1002 and, thereby, to the working channel of endoscope 1000. (By proper formation of the hub 1001, the irrigation channel could also be coupled directly to the working channel.)

These portions of endoscope 1000 allow the physician to irrigate the area of the body being treated. For example, through the irrigation channel liquids or air may be injected into the working channel and thereby to the area of the body being treated. Such liquids can include water, saline, anesthetics, or antiseptics. The injection can occur through the operation of a syringe or other similar instrument coupled to irrigation port 1006. Moreover, the irrigation channel can also be used as a port through which a laser, such as an Eximer laser, could be utilized. In that situation, the laser is inserted through the irrigation channel and into the working channel until it reaches the area of interest internal to the patient. The laser can then be used, for example, as a means for clearing a blocked passageway.

Although again not necessary for every embodiment, FIG. 25 also shows endoscope 1000 as including tube portion 1007 coupled between hub 1001 and video port 1008. As one skilled in the art will appreciate, the video port 1008 may be any suitable video coupler, and will preferably include magnification means. Tube portion 1007, in one embodiment, is approximately 2.5 feet long and is formed most advantageously with some flexible material, such as a flexible plastic, so that it can be easily connected to video equipment and the like. Tube 1007 and video port 1008 are formed such that they include a passageway in their interior capable of holding numerous fiber optic strands. Such strands run from video port 1008, through tube portion 1007 into hub 1001. The strands run through hub 1001 into the inner passageway of tube portion 1004, though outside of the working channel, as described in more detail below. These strands provide both a light source to the area of interest and a video source to the video port, allowing the physician to see an image of the area of interest while treatment is occurring. Video port 1008 is therefore formed such that it includes a light source connector 1009 and can be coupled to a video camera, monitor and raster screen, as described in more detail below. As a result of the improved magnification and viewing qualities achieved using aspherical lenses of the type discussed above, it has been found that a video coupler having a lower magnification than in conventional endoscope systems may be used.

Figure 26:
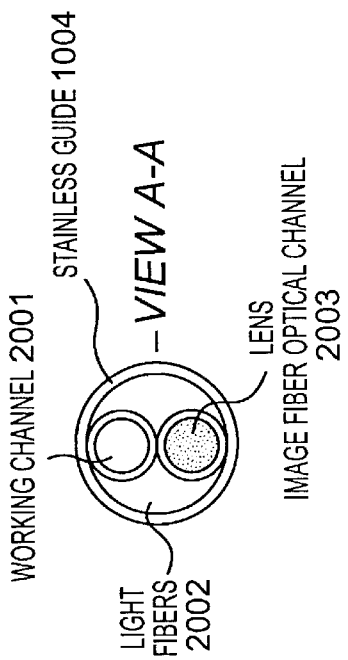
FIG. 26 is a cross-sectional view of the guide of the endoscope of the disclosed embodiment.

A cross-sectional view of a stainless steel guide 1004, as seen from viewpoint A—A on FIG. 25, is shown in detail in FIG. 26. In FIG. 26, the rigid, steel tube option is depicted, although the figure could just as readily depict the flexible tube option. More specifically, FIG. 26 shows tube portion 1004, which contains working channel 2001, a plurality of optical light fibers 2002 and lens 2003. Guide 1004 has an outer diameter of approximately 1.2 mm. Working channel 2001 has an outer diameter of approximately 0.35 mm and an inner diameter of approximately 0.25 mm. Tubing for such a channel can be obtained from, for example, Solos Endoscopy Co. of Braintree, Me.

The use of a working channel 2001 having a reduced working channel outer diameter, such as 0.35 mm allows for a corresponding increase in the number of optical or light fibers 2002 and/or an increase in the size of the lens 2003 in the image fiber optical channel (see e.g., FIG. 26). In addition, because of the decrease in overall size of the endoscopes of the present invention, countless medical procedures can be performed in a less invasive and less traumatic manner than was previously known. For example, in many cases, ducts may be utilized as entry points to a body, as opposed to a surgical incision. Moreover, ductules, such as those of the female breast, which previously were inaccessible due to the size of conventional endoscopic devices, can now be analyzed and diagnosed for diseases, such as cancer, well before such diagnoses would be available with conventional systems.

In the embodiment shown in this figure there are 16 optical fibers running down the length of guide 1004, each having a diameter of approximately 0.125 mm. These fibers act to provide light to the area of interest, although a different number of fibers and/or fibers of different diameters may also be used. Lens 2003 also runs longitudinally down the inner passage of guide 1004 and has a diameter of 0.35 mm.

Figure 27:
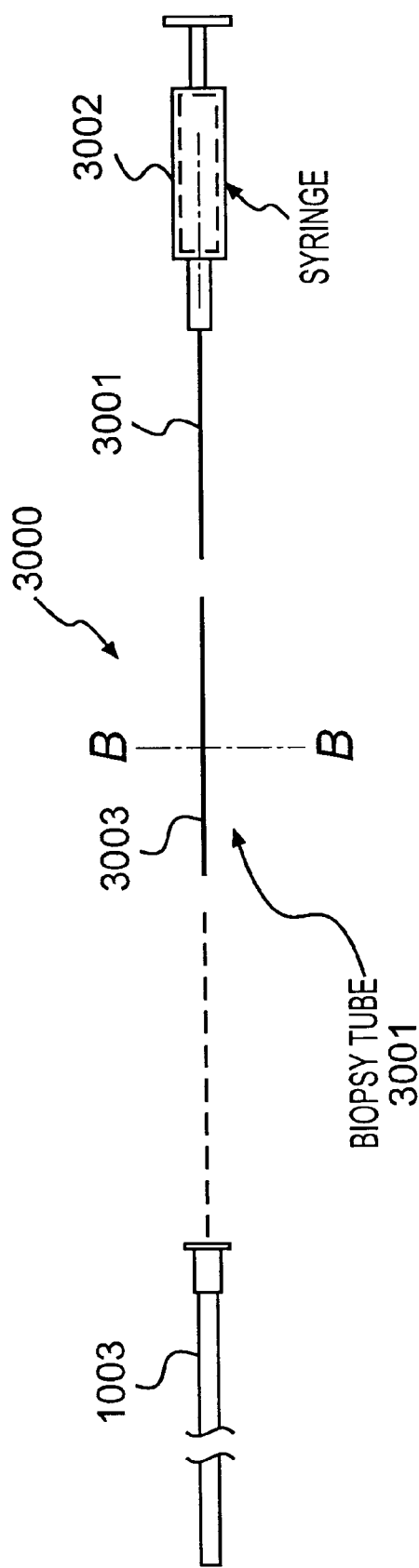
FIG. 27 is a side elevational view of one embodiment of the biopsy tube of the present invention.

Referring now to FIG. 27, there is shown a sectional elevation of a biopsy tube 3000 to be used with the endoscope of the present invention. The biopsy tube 3000 includes tube portion 3001, which includes a hollow passageway down its length, coupled to syringe 3002, or some other similar instrument, and having an end portion 3003. The tube has an outer diameter of approximately 0.135 mm which allows it to be inserted into the working channel of guide 1004 of endoscope 1000, as shown in FIG. 3A.

In one embodiment, end portion 3003 does not include a scraper or biopsy brush for the extraction of biopsy cells, although in other embodiments it could. Rather, the distal end of the biopsy tube has no brush or medical instrument whatsoever attached and is more like the end of a tube or needle. Because the tube is of such a small outer diameter, the physician can manipulate the biopsy tube from the proximal end in order to scrape cells free of the tissue. The physician can then irrigate the location by ejecting water under pressure through the irrigation channel through the operation of syringe 3002. This causes the water injected into the patient to mix with the scraped biopsy cells. Such water and cells can be drawn into the biopsy tube 3000 by withdrawing the plunger of the syringe 3002. Once the endoscope is removed from the patient's body, the plunger of syringe 3002 can be pushed back in and the biopsy cells disgorged onto a slide or into a transmission medium for later testing.

Biopsy tube 3000 can be made of stainless steel, flexible plastic, or some other suitable material, depending on the guide with which it will be used. A biopsy tube suitable for use in the present invention may be obtained from United Machines, Inc. of Bohemia, N.Y.

In further exemplary embodiments, it will be preferable to utilize a biopsy tube 3000, or other instrument to be inserted into an endoscope working channel, such as a scraper or cytology instrument having a roughened end portion. Particularly for use in a relatively small working channel, such as the 0.35 mm channel as discussed above or smaller, a composition of the cytology instrument will be important. In one embodiment, a cytology instrument is contemplated which has a 0.25–0.30 mm diameter for use in a 0.33–0.35 mm working channel. Because of the relatively small proportions, the cytology instrument must be formed of a material having sufficient strength to allow effective scraping and cell removal. Since the end portion 3000 will be used within the body, the end portion 3000 is further preferably formed of, or at least coated by, a suitable biocompatible material.

One material that meets these requirements is Nitinol (NiTi), an alloy of titanium. It is contemplated that forming further alloys by combining Nitinol with other elements or compounds may lead to suitable materials as well. Nitinol has been found to exhibit favorable strength and biocompatibility characteristics in numerous surgical applications. For example, Nitinol enjoys a high tensile strength and resistance to lateral deformation, as well as resilience to an environment of the human body, such that a device formed thereof can be used repeatedly without degradation. Importantly, Nitinol has further been classified as biologically inactive, indicating that internal use of Nitinol elicits a minimal, if any, negative response from the human body. Further information regarding the biocompatibility of Nitinol may be obtained by reference to the following dissertation which is hereby incorporated herein by reference in its entirety: Ryhanen, Jorma, "Biocompatibility Evaluation of Nickel-Titanium Shape Memory Metal Alloy," presented at the University Hospital of Oulu, Finland, May 7, 1999 (presently available at http://herkules.oulu.fi/issn03553221/).

A cytology instrument of this embodiment advantageously has a working end adapted for any of a variety of biopsy functions, such as scraping. Therefore, the working end may be roughened or otherwise made abrasive for this purpose.

A roughened working end may be formed in a variety of ways. For example, a laser energy source may be directed at a Nitinol instrument, thereby removing an oxide layer at the surface. This will leave behind an abrasive surface that is suitable for scraping. Alternatively, the oxide layer may be removed by sandblasting, which will also leave a roughened surface.

In another embodiment, a Nitinol surface may be roughened to form an abrasive surface by stone grinding, such as with a stone wheel. The degree of abrasiveness may be controlled by varying an amount of stone grinding. Alternatively, a tool and die can be used to impart a controllable amount of roughness to a Nitinol surface. In this method, the tool and die are used to score the surface creating a desired abrasiveness.

A method of using a Nitinol cytology instrument to retrieve biopsy cells or other bodily materials will now be described. As discussed above with respect to FIGS. 26 and 27, the endoscope 1000 is first used to locate an area of the body to be biopsied. The area may be a cell, tissue or other abnormality, such as a papilloma or other tumor, or alternatively an area of normal, healthy cells, such as in preventative and/or diagnostic procedures.

The Nitinol cytology instrument will then be inserted through the working channel 1003, and manipulated with the visual assistance of the endoscope 1000 to scrape a portion of the area, perhaps a number of cells, a sample of lining, etc., from the area to be biopsied or studied. A syringe or other means is used to inject a fluid, such as saline solution, through the irrigation channel 1005, such that the fluid and biopsied material mix. Alternatively, the fluid may be injected prior to the scraping. Next, to remove the biopsied material, it is preferable in this embodiment to aspirate the injected fluid and biopsied material through the working channel following removal of the Nitinol cytology instrument. Once the mixture of biopsied material and fluid has been aspirated, samples thereof may be tested in any of a variety of ways, or placed on a slide for viewing under a microscope.

It is also an advantageous feature of the present invention that, because the above-described procedure is carried out endoscopically, as compared to a biopsy via an open incision for example, biopsied materials, such as papillomas, have a reduced tendency to migrate within the body prior to aspiration. This feature is important not only in obtaining a complete sample, but also in preventing contamination of other areas of the body with biopsied material. For example, the spread of tumor cells within the body, particularly if cancerous, can be highly detrimental to a patient.

Figure 28:
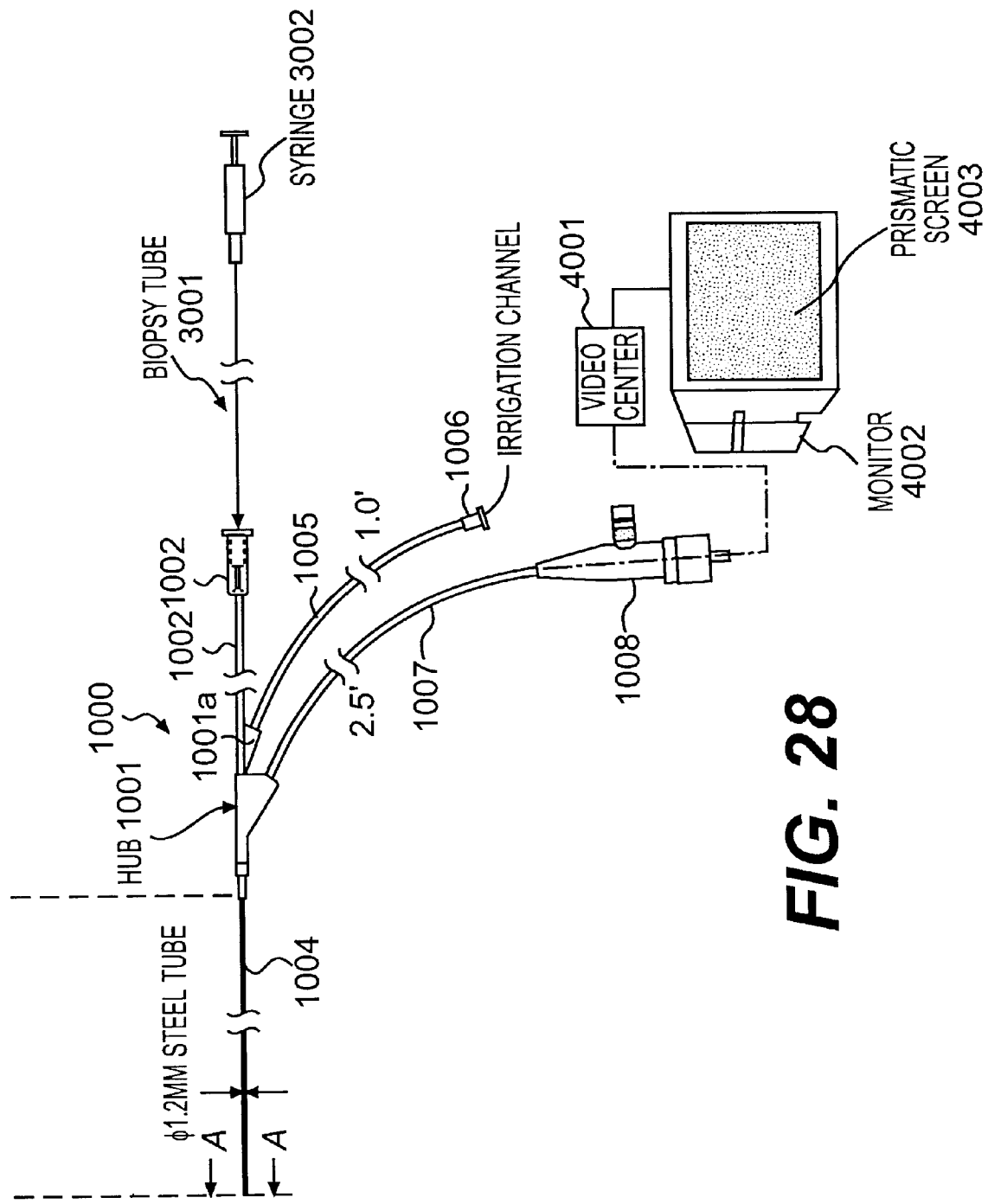
FIG. 28 is a side elevational view of the endoscope of the disclosed embodiment coupled to a syringe for biopsy cell extraction and to video equipment for increased depth of field viewing.

FIG. 28 depicts endoscope 1000 used in conjunction with a video monitor and prismatic screen as described above. For example, in FIG. 28 the video port 1008 is coupled to a video camera 4001, the output of which is coupled to video monitor 4002 having as an attachment prismatic screen 4003. Prismatic screen may also include an optical element, such as a spherical or aspherical lens or other device, as described above.

Video camera 4001 may be of many different commercially available models, although CCD cameras are particularly useful in this type of application. Specifically, a Panasonic GS9900-NTSC medical video endoscopy camera, from Matsushita Electric Corporation of America, has been found to be useful. Moreover, it has been found that in such a camera a ¼ inch CCD chip is more advantageous than a ½ inch CCD chip, because it provides an image with smaller pixels. Such chips are included in CCD cameras and also are commercially available from many sources such as, for example, the Sony Corporation of America. Video monitor 4002 may be any of a number of commercially available video monitors.

Figure 37:
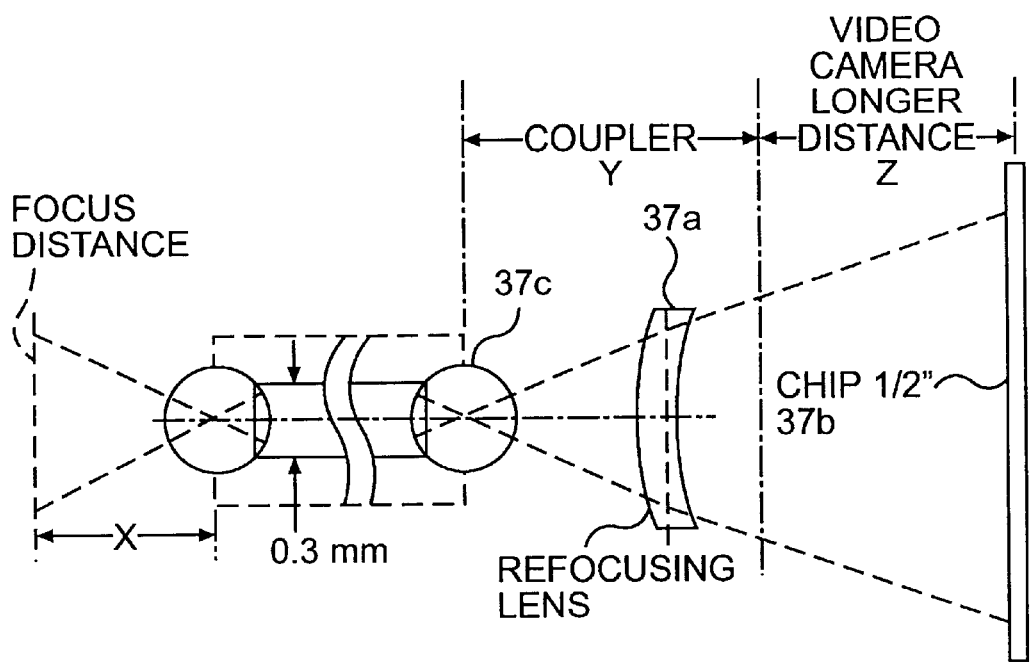
FIG. 37 is an illustration of a conventional endoscope employing a ½ inch video camera chip.
Figure 38:
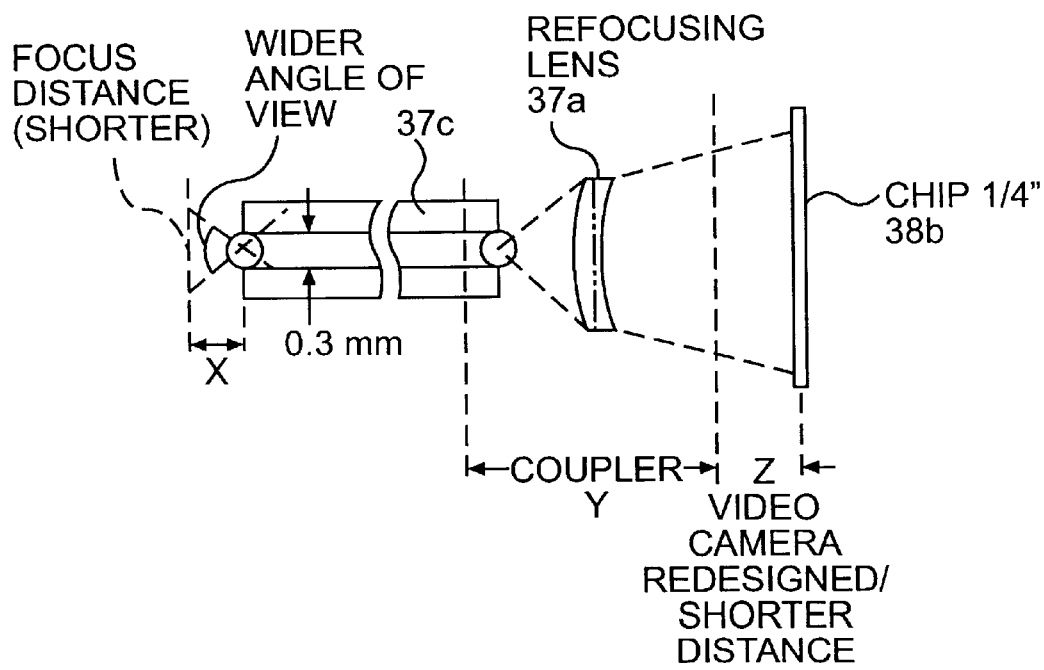
FIG. 38 is an illustration of an embodiment of the present invention employing a ¼ inch video camera chip.

Referring now to FIGS. 37 and 38, there are shown a conventional endoscope employing a ½ inch CCD chip 37*b* and a preferred embodiment of the present invention employing a ¼ inch video CCD chip 38*b,* respectively. As can be seen by comparing FIGS. 37 and 38, the present invention provides for a closer focus distance X. Such a shortened focus distance is achieved by refocusing the coupler 37c to a shorter optical distance and by reducing the size of the CCD chip to ¼". Exemplary focus distances are from about 1.0 to about 2.0 mm as compared to about 4.0 mm for a 3.0 diameter conventional endoscope. Such short focal lengths are advantageous for performing medical procedures in, for example, but not limited to, small ductules, like those present in the human breast and other areas of the human body as described herein.

These shortened focus distances are also achieved by reconfiguring the video camera housing and coupling the video CCD chip at a closer distance (depicted as Y in FIGS. 37 and 38) to the coupler 37c. The video camera is optically redesigned with a new housing and shorter distance bracket than conventional systems which allows the distance between the video chip 38b and the front of the video camera to be much shorter than conventional systems (see Z in FIGS. 37 and 38). It should also be apparent to one skilled in the art that refocusing lens 37a can be any suitable lens, for example, but not limited to, a spherical, drum, aspherical, or stepped aspherical lens, as described herein.

Figure 39:
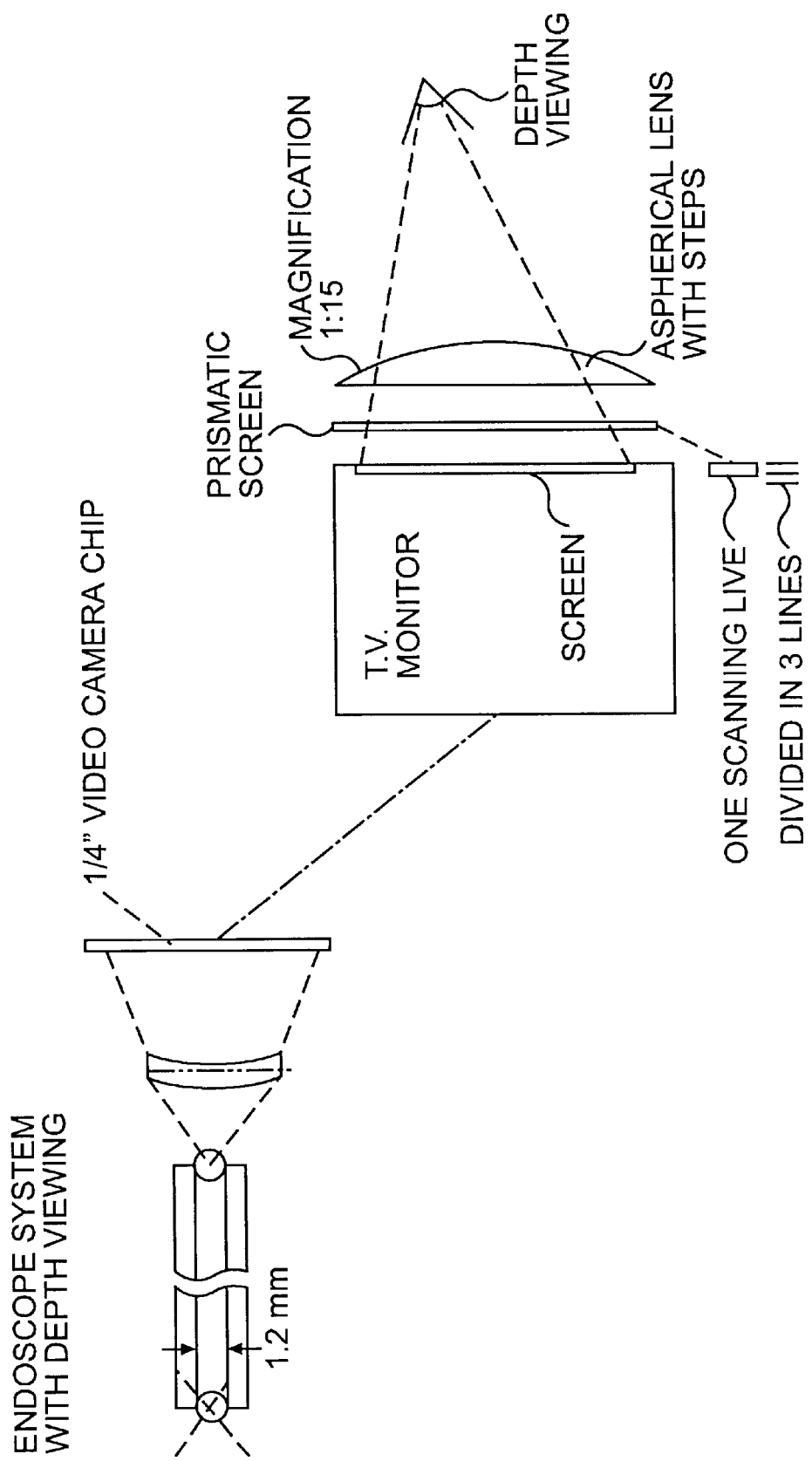
FIG. 39 is an illustration of an embodiment of the depth of field viewing system of the present invention employing the ¼ inch video camera chip.

The present invention allows the image magnification to be maintained at the prior level of much larger endoscopic systems without degradations in image quality which are inherent in conventional microendoscopic systems. The same number of scanning lines can be achieved with shorter focal lengths and larger depths of field (e.g., about 50% larger for a focus distance of about 1 to about 2 mm) by dividing each scanning line into three or more lines, thereby increasing projected image quality by reducing the visibility of the scanning lines. Larger depths of field are achieved because of the shortened optical focal length of the coupler as shown in FIG. 39. As a result, smaller, less visible scanning lines are present thereby facilitating numerous medical procedures which were previously unattainable given the image and quality limitations of conventional microendoscopic systems.

It is not necessary to include a prismatic screen to use the endoscope of the present invention. However, the use of such a screen is advantageous because, as described above, the screen provides an image with increased clarity and perception of depth by causing the brain of the viewer to interpret depth cues present in the image. This increased perception of depth is particularly advantageous in medical procedures like those that employ endoscopes because of the small dimensions involved and the limited lighting available in the interior of a patient's body. Moreover, because the fiber optic elements of any endoscope are necessarily small, the image generated by them is also small, limiting its usefulness to the physician and its practicality during the procedure. The prismatic screen described in the patents and application above, when used conjunction with the endoscopic instrument described above, produces an image anywhere from 25% to 100% larger than use of the instrument without the screen. Thus, the endoscope of the present invention coupled with the prismatic screen of the above referenced patents and patent application permit the physician to perform the biopsy, or other procedure, while actually viewing the progress and operation of the instrument and to do so in a much more advantageous manner.

Operation of endoscope 1000 will now be described briefly in order better to explain various uses of the invention in some situations. Generally speaking, endoscope 1000, using either the flexible or rigid guides 1004, is inserted into an orifice or incision in the patient's body. The physician can view the areas of the body through which the endoscope passes on its way to the area of interest and can view the area of interest once it is reached by watching the screen 4003 attached to video monitor 4002. Once at the appropriate place in the patient's body, the physician can manipulate the biopsy tube 3001 in order to retrieves cells from that area or perform some other medical procedure. For example, the physician can inject water into the area of interest through the working channel using a syringe coupled to the biopsy tube. He can then aspirate the water and sample cells through the operation of the syringe. The cells are then retrieved with the water, through the working channel, poured into a sterilized plastic container, for example, and taken to pathology for diagnostic testing.

Occasionally the lens of endoscope 1000 may need to be cleared of blood and cell particles as a procedure is being performed. The irrigation channel and the working channel may be used in performing this function by, first, applying a liquid under pressure through the use of a syringe attached to the irrigation port. This has the effect of both widening the viewing area and clearing the viewing area of blood. However, it is important to apply the fluid using a pressure higher than that of the blood.

Second, because liquids will often become quickly colored with blood, air pressure is applied through the working channel by a syringe coupled to the irrigation port. This creates a small cavity around the end of the endoscope and pushes the fluids in the patient's body out of the viewing area. This, consequently, clears the way for the light emitted from the light source optical fibers and for the resulting light entering the lens, thereby creating a much clearer image for the physician.

The present invention can be used in many different specialized procedures. For example, the endoscope of the present invention can be used in a breast duct diagnostic procedure whereby the guide is inserted through the dilated nipple of the breast and the area of interest is viewed on the screen. A biopsy may be performed if necessary. Thus, the present invention allows a non-invasive procedure useful in detecting breast cancer through direct visualization by the treating physician.

The present invention may also be used in techniques similar to angiograms and angioplasty, whereby the endoscope 1000 utilizing a flexible guide is inserted into an artery. The treating physician can see the inside of the artery on the screen and can determine the extent and type, if any, of blockage in the artery. This technique can also be used with respect to smaller veins and arteries that carry blood to and from much more difficult parts of the body to reach, such as the lungs, neck and chest.

Glaucoma investigation and other ocular procedures can also be accomplished with the present invention, most usefully using a shorter, rigid guide. Such procedures include inserting the guide of the endoscope into the tear duct of the eye, viewing its interior on the screen and performing a medical procedure, such as aspiration, for example, or clearing of a blocked passageway through the utilization of an Eximer laser.

In addition, the present invention can be used to traverse the optical nerve such that the alignment between the optical nerve and the brain can be checked prior to, and following, for example, a corneal transplant or other ocular transplant or surgery. In addition to alignment between the optical nerve and the brain, the present invention allows for identification and treatment of other abnormalities that might exist within the optical nerve that were previously undetectable using conventional systems.

Indeed, a particularly advantageous use of the present invention is in the treatment of cancer in various parts of the body. Cancer is generally treatable in three ways: surgery, radiation and chemotherapy. Surgery and radiation, of course, have risks and disadvantages well known to those of skill in the art. Chemotherapy also can be particularly disadvantageous as, for example, when the drugs involved cause sickness to the patient when they enter the blood stream. One advantage of the present invention is that, due to its size and the quality of image obtainable, the physician can inject liquids directly into a cancerous tumor, minimizing the collateral damage or exposure to chemotherapeutic chemicals to other portions of the body.

Because of the microscopic size of the endoscope of the present invention, papillomas or other cancerous growths can be diagnosed well in advance of when they were able to be detected and treated using conventional open breast surgeries or the like. For example, using the system of the present invention, the endoscope can be used to traverse a breast ductule up to a papilloma or other abnormality. A laser, such as an Eximer laser, or other suitable device can then be inserted into the small working channel of the endoscope and positioned adjacent the abnormality. In this fashion, the laser can be used to burn or otherwise break up the abnormality whereupon it can be removed from the body. Through use of the present invention, microprocedures such as those described herein provide an invaluable ability to both view cancerous growths in their infancy and provide a means by which to remove the air cancerous growths before they are allowed to spread to other parts of the body. Indeed, such procedures can be accomplished without the more invasive techniques of open breast surgeries and the like.

Further, the present invention is useful in the diagnosis and treatment of prostate cancer that often requires surgery or an extremely invasive endoscopic procedure through the penis or anus. The endoscopic system of the present invention permits a much less invasive procedure and allows the physician to visualize, by seeing on the screen, exactly what is happening as it happens.

This invention is also particularly useful in pediatric applications, such as a drainage of the lacrimal sinus of an infant in order to aspirate any pools of mucus that have built up in the underdeveloped sinus of the child, thereby halting any developing infection.

Indeed, procedures in which physicians must invade any cavity of the body whether in children or adults, and in which physicians have been visually limited in the past, may be performed with the present invention in a much less invasive manner and with the physician able to see exactly what he or she is doing. Such procedures include, for example, laryngeal and esophagus related procedures, peritoneal and abdominal cavity procedures, obstetrics and gynecological procedures, sigmoid-colon procedures, parotid gland procedures, oral surgery, including root canals, spinal cord procedures, procedures directed to the lymph nodes, small joint procedures and even medical procedures on animals.

The principles, embodiments and modes of operation of the present invention have been described in the foregoing specification. The invention that is sought to be protected herein, however, is not to be considered as limited to the particular forms disclosed, since these are to be regarded as illustrative rather than restrictive. Variations and changes may be made by those skilled in the art without departing from the spirit and scope of the invention. For example, the present invention is not limited to the particular dimensions or uses described, except as explicitly defined in the claims.

What is claimed is:

1. A method of extracting biopsy cells from a body using an endoscopic instrument having a distal end that is sub statially needle like, said method comprising the steps of:
    (a) inserting said instrument into a nipple of a breast;
    (b) causing liquid to be ejected from the distal end of said instrument;
    (c) causing reverse pressure to form at the distal end of such instrument so that said liquid and biopsy cells are retrieved into said instrument; and
    (d) extracting said cells from said breast,
    wherein the endoscopic instrument includes a guide having a working channel, a light source and a lens.

2. The method of claim 1, wherein step (a) includes:
    projecting an image of the interior of said breast on a video monitor.

3. A method of extracting biopsy cells from a body using an endoscopic instrument having a distal end that is substantially needle like, said method comprising the steps of:
    (a) inserting said instrument into a nipple of a breast;
    (b) causing liquid to be ejected from the distal end of said instrument;
    (c) causing reverse pressure to form at the distal end of such instrument so that said liquid and biopsy cells are retrieved into said instrument; and
    (d) extracting said cells from said breast,
    wherein the endoscopic instrument includes a guide having a working channel, a light source and a lens, said guide coupled to means for receiving a medical instrument, to means for irrigating and to means for supplying image information image, and
    wherein the endoscopic instrument also includes a video camera coupled to a video monitor.

4. The method of claim 3, wherein said video monitor is coupled to an aspherical lens.

5. The method of claim 4, wherein a first radius of said aspherical lens blends into a second radius of said aspherical lens.

6. The method of claim 4, wherein said aspherical lens is comprised of more than 2 radii.

7. The method of claim 3, wherein step (a) includes:
    projecting an image of the interior of said breast on said video monitor.

8. A method of extracting biopsy cells from a body using an endoscopic instrument having a distal end that is substantially needle like, said method comprising the steps of:
    (a) inserting said instrument into a nipple of a breast;
    (b) causing liquid to be ejected from the distal end of said instrument;
    (c) causing reverse pressure to form at the distal end of such instrument so that said liquid and biopsy cells are retrieved into said instrument; and
    (d) extracting said cells from said breast,
    wherein the endoscopic instrument is coupled to an apparatus for depth of field viewing, said apparatus including:
        a transparent screen for positioning between a flat image and a viewer, said transparent screen including a plurality of optical elements formed in said screen; and
        an aspherical lens for positioning between said screen and a viewer, said lens being curved across its width which curvature is defined by at least two radii.

9. The method of claim 8, wherein a first radius of said aspherical lens blends into a second radius of said aspherical lens.

10. The method of claim 8, wherein said aspherical lens is comprised of more than 2 radii.

11. A method of extracting biopsy cells from a body using an endoscopic instrument having a distal end that is substantially needle like, wherein the endoscopic instrument is coupled to a video camera and a video monitor, said method comprising the steps of:

(a) inserting said instrument into a nipple of a breast;

(b) causing liquid to be ejected from the distal end of said instrument;

(c) causing reverse pressure to form at the distal end of such instrument so that said liquid and biopsy cells are retrieved into said instrument; and (d) extracting said cells from said body, wherein the endoscopic instrument includes a guide having a working channel.

12. The method of claim 11, wherein the endoscopic instrument further includes a light source and a lens, and wherein the guide is coupled to a biopsy tube, an irrigation channel, and to a video port.

13. A method of extracting biopsy cells from a body using an endoscopic instrument having a distal end that is substantially needle like, said method comprising the steps of:

(a) inserting said instrument into a nipple of a breast;

(b) causing liquid to be ejected from the distal end of said instrument;

(c) causing reverse pressure to form at the distal end of such instrument so that said liquid and biopsy cells are retrieved into said instrument; and (d) extracting said cells from said body, wherein the endoscopic instrument is coupled to an apparatus for depth of field viewing.

14. The method of claim 13, wherein the apparatus for depth of field viewing includes:

a transparent screen for positioning between a flat image and a viewer, said transparent screen including a plurality of optical elements formed in said screen.

* * * * *